United States Patent
Matsuoka

(10) Patent No.: US 12,476,284 B2
(45) Date of Patent: Nov. 18, 2025

(54) NON-AQUEOUS ELECTROLYTE SOLUTION, CELL PACK, AND METHOD FOR MANUFACTURING CELL PACK

(71) Applicant: Asahi Kasei Kabushiki Kaisha, Tokyo (JP)

(72) Inventor: Naoki Matsuoka, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 624 days.

(21) Appl. No.: 17/635,465

(22) PCT Filed: May 28, 2021

(86) PCT No.: PCT/JP2021/020559
§ 371 (c)(1),
(2) Date: Feb. 15, 2022

(87) PCT Pub. No.: WO2021/241762
PCT Pub. Date: Dec. 2, 2021

(65) Prior Publication Data
US 2022/0320585 A1 Oct. 6, 2022

(30) Foreign Application Priority Data
May 29, 2020 (JP) .................................. 2020-094198

(51) Int. Cl.
*H01M 10/0568* (2010.01)
*H01M 4/02* (2006.01)
(Continued)

(52) U.S. Cl.
CPC ... *H01M 10/0568* (2013.01); *H01M 10/0569* (2013.01); *H01M 2004/027* (2013.01);
(Continued)

(58) Field of Classification Search
CPC ......... H01M 10/0568; H01M 10/0569; H01M 4/587; H01M 2004/027; H01M 2004/028;
(Continued)

(56) References Cited

U.S. PATENT DOCUMENTS 5,763,119 A 6/1998 Adachi
2006/0199080 A1 9/2006 Amine et al.
(Continued)

FOREIGN PATENT DOCUMENTS

CN 103703602 A 4/2014
CN 104810564 A 7/2015
(Continued)

OTHER PUBLICATIONS

English translation of JP-2013232326-A (Year: 2013).*
(Continued)

*Primary Examiner* — Ula C Ruddock
*Assistant Examiner* — Sarika Gupta
(74) *Attorney, Agent, or Firm* — Morgan, Lewis & Bockius LLP

(57) ABSTRACT

Provided is a high-capacity cell pack in which cell imbalance is eliminated, precipitation of a poorly soluble redox shuttle can be prevented, deterioration due to overcharging is suppressed, cell yield is improved, and charge/discharge cycling is stable. The cell pack according to the present invention is a cell pack comprising non-aqueous secondary cells each comprising a non-aqueous electrolyte solution containing an electrolyte salt and a non-aqueous solvent, a positive electrode, and a negative electrode, wherein the cell pack is configured with a module in which two or more of the non-aqueous secondary cells are connected in series or with two or more of the modules in parallel, or the cell pack is configured with a module in which two or more of the (Continued)

non-aqueous secondary cells are connected in parallel or with two or more of the modules in series.

12 Claims, 8 Drawing Sheets

(51) Int. Cl.
*H01M 4/587* (2010.01)
*H01M 10/0569* (2010.01)

(52) U.S. Cl.
CPC ...... *H01M 2004/028* (2013.01); *H01M 4/587* (2013.01); *H01M 2300/0037* (2013.01)

(58) Field of Classification Search
CPC ......... H01M 2300/0037; H01M 4/136; H01M 4/5825; H01M 10/0525; H01M 2004/021; H01M 50/204; H01M 2300/004; H01M 10/0567; H01M 10/4235; H01M 2010/4292; Y02E 60/10
See application file for complete search history.

(56) References Cited

U.S. PATENT DOCUMENTS

| | | |
|---|---|---|
| 2013/0108913 A1 | 5/2013 | Barchasz et al. |
| 2014/0242474 A1 | 8/2014 | Matsui et al. |
| 2014/0255796 A1* | 9/2014 | Matsuoka ............. H01M 4/139 429/188 |
| 2015/0017499 A1 | 1/2015 | Nishiyama et al. |
| 2016/0056418 A1 | 2/2016 | Yang et al. |
| 2018/0026297 A1 | 1/2018 | Odom et al. |
| 2019/0393556 A1 | 12/2019 | Matsuoka et al. |
| 2020/0091554 A1 | 3/2020 | Matsuoka et al. |
| 2021/0344045 A1 | 11/2021 | Shoji et al. |
| 2022/0271338 A1 | 8/2022 | Kamine et al. |

FOREIGN PATENT DOCUMENTS

| | | |
|---|---|---|
| CN | 105390649 A | 3/2016 |
| CN | 110383564 A | 10/2019 |
| JP | H05-062681 A | 3/1993 |
| JP | H07-302614 A | 11/1995 |
| JP | H09-017447 A | 1/1997 |
| JP | H09-022689 A | 1/1997 |
| JP | 2007-531972 A | 11/2007 |
| JP | 2011-512014 A | 4/2011 |
| JP | 2013-171659 A | 9/2013 |
| JP | 2013-171715 A | 9/2013 |
| JP | 2013-178935 A | 9/2013 |
| JP | 2013232326 A * | 11/2013 |
| JP | 2014-199779 A | 10/2014 |
| JP | 2015-520935 A | 7/2015 |
| JP | 5931572 B2 | 6/2016 |
| KR | 10-2008-0012832 A | 2/2008 |
| WO | 2005/099024 A2 | 10/2005 |
| WO | 2009/102604 A1 | 8/2009 |
| WO | 2013/062056 A1 | 5/2013 |
| WO | 2013/129182 A1 | 9/2013 |
| WO | 2013/177138 A1 | 11/2013 |
| WO | 2018/169029 A1 | 9/2018 |
| WO | 2020/262670 A1 | 12/2020 |
| WO | 2021/049648 A1 | 3/2021 |

OTHER PUBLICATIONS

Supplementary European Search Report issued in corresponding European Patent Application No. 21812139.0 dated Sep. 14, 2022.
International Search Report issued in corresponding International Patent Application No. PCT/JP2021/020559 dated Aug. 31, 2021.
International Preliminary Report on Patentability and Written Opinion issued in corresponding International Patent Application No. PCT/JP2021/020559 dated Dec. 8, 2022.

* cited by examiner

NON-AQUEOUS ELECTROLYTE SOLUTION, CELL PACK, AND METHOD FOR MANUFACTURING CELL PACK

FIELD

The present invention relates to a non-aqueous electrolyte solution, a cell pack, and a method for manufacturing the cell pack.

BACKGROUND

The way of using lithium-ion cells, which used to be unit cells for mobile and IT applications, is changing significantly in the global trend of electrification of automobiles. The individual differences in unit cells, which are not a big issue when cells are used as unit cells, become a vital issue as a cause of local overcharging/overdischarging due to an imbalance of cells when used in modules. Thus, selecting unit cells without individual differences for modularization is required.

From the viewpoint of yield, screening to adjust for individual differences in unit cells is extremely inefficient. Electric vehicles in the present avoid the effects of imbalance by setting the full charge to a voltage lower than that for consumer use. However, if the function to automatically adjust the imbalance can be imparted into a module, it can contribute to both productivity and functionality.

As an overcharge suppression mechanism in lithium-ion cells, methods via a chemical reaction and methods via an electronic circuit have been proposed, with mainly the latter adopted in practical use. However, with methods via an electronic circuit, not only does the cost increase as the number of cells increases, but various constraints also occur in product design.

The development of techniques to suppress overcharging by chemical reactions has been progressing. Among these, in non-aqueous electrolyte solutions, a method of adding a redox reagent having a redox potential corresponding to an overcharge potential to a non-aqueous electrolyte solution has been considered. According to this method, when the reversible reactivity of the redox reagent is good, a suppression mechanism by which reciprocation between positive and negative electrodes consumes an overcharge current is formed.

Such a redox reagent is called a redox shuttle. If including a redox shuttle in a non-aqueous electrolyte solution can simplify the safety device of a lithium-ion cell, a cell system having a lower cost than a cell system having an overcharge suppression mechanism via an electronic circuit can be realized. In addition, the extra power consumption by the electronic circuit itself can be suppressed, which is very useful.

For example, PTL 1 and 2 below report that an aromatic compound having a structure in which a methoxy group is introduced into a benzene ring functions as a redox shuttle for a lithium-ion cell of 4 V class or higher.

PTL 3 below reports that acetonitrile is used as a non-aqueous solvent, whereby the redox shuttle functions to suppress overcharging even when charging at high current density.

PTL 4 below reports a multicell lithium-ion battery in which a non-aqueous electrolyte solution containing a redox shuttle is used.

CITATION LIST

Patent Literature

[PTL 1] Japanese Unexamined Patent Publication (Kokai) No. 7-302614
[PTL 2] Japanese Unexamined Patent Publication (Kokai) No. 9-17447
[PTL 3] Japanese Unexamined Patent Publication (Kokai) No. 2013-232326
[PTL 4] Japanese Unexamined PCT Publication (Kohyo) No. 2015-520935

SUMMARY

Technical Problem

However, diffusion is the rate-determining factor for the function of the redox shuttle in PTL 1 and 2, whereas diffusion within the electrode layer does not reach a practical level in a conventional non-aqueous electrolyte solution. The common issue for redox shuttles is that it is difficult to obtain an overcharge suppressing effect under conditions other than unrealistic conditions where non-aqueous secondary cells are charged at extremely low current density.

PTL 3, previously filed by the present inventors, describes a non-aqueous solvent containing acetonitrile but does not specifically describe a cell pack.

PTL 4 describes a general structure of a cell pack, but only describes the cell materials in a similar manner, and neither recognizes the above issue nor describes means for overcoming the issue.

The present invention has been made in view of the above circumstances. It is an object of the present invention to provide a non-aqueous electrolyte solution and a high-capacity cell pack, wherein even if the initial capacities of the non-aqueous secondary cells constituting the cell pack are not matched, the imbalance between two or more non-aqueous secondary cells when charged at high current density is eliminated and the charge/discharge cycling is stable. Another object of the present invention is to provide a non-aqueous electrolyte solution and a cell pack, wherein the capacity difference between two or more non-aqueous secondary cells is eliminated even at low temperature and high temperature.

Solution to Problem

The present inventors have intensively studied to achieve the above objects. As a result, they have discovered that a cell pack comprising non-aqueous secondary cells each comprising a specific non-aqueous electrolyte solution, a positive electrode, and a negative electrode automatically eliminates the imbalance between two or more non-aqueous secondary cells in a module regardless of individual differences among the non-aqueous secondary cells and can contribute to both productivity and functionality, thus completing the present invention.

The present invention is described as follows:

[1] A cell pack comprising non-aqueous secondary cells each comprising a non-aqueous electrolyte solution containing an electrolyte salt and a non-aqueous solvent, a positive electrode, and a negative electrode, wherein the cell pack is configured with a module in which two or more of the non-aqueous secondary cells are connected in series or with two or more of the modules connected in parallel, or the cell pack is configured with a module in which two or more of the non-aqueous secondary cells are connected in parallel or with two or more of the modules connected in series;

each of the non-aqueous secondary cells constituting the module has a ratio of maximum capacity (B) to minimum capacity (A) of 1.00<B/A<2.00; and the non-aqueous electrolyte solution contains a redox shuttle having a reversible redox potential at a greater electropositive potential than a positive electrode potential at full charge.

[2] The cell pack according to [1], wherein the redox shuttle contains a compound represented by general formula (1) below:

[Chem. 1]

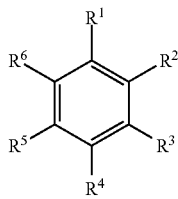

(1)

wherein $R^1$, $R^2$, $R^3$, $R^4$, $R^5$, and $R^6$ represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms.

[3] The cell pack according to [2], comprising the compound represented by general formula (1) in an amount of 0.1 to 20% by mass with respect to a total amount of the non-aqueous electrolyte solution.

[4] The cell pack according to any of [1] to [3], wherein each of the non-aqueous secondary cells constituting the module has a capacity of 1 mAh to 100 Ah, and each of the non-aqueous secondary cells has a ratio of maximum capacity (B) to minimum capacity (A) of 1.05<B/A<2.00.

[5] The cell pack according to any of [1] to [4], wherein the non-aqueous solvent contains acetonitrile and a linear carbonate.

[6] The cell pack according to [5], wherein in the non-aqueous solvent, the volume ratio of the acetonitrile is less than the volume ratio of the linear carbonate.

[7] The cell pack according to any of [1] to [6], wherein the electrolyte salt comprises an imide salt and $LiPF_6$, the imide salt has a content of 0.5 mol to 3 mol per L of the non-aqueous solvent, and $LiPF_6$<the imide salt in molar ratio in the non-aqueous electrolyte solution.

[8] The cell pack according to any of [1] to [7], wherein the non-aqueous electrolyte solution has an ionic conductivity of 10 to 50 mS/cm at 25° C.

[9] The cell pack according to any of [1] to [8], wherein a positive electrode active material layer contained in the positive electrode has a basis weight of 15 to 100 mg/cm².

[10] The cell pack according to [1] to [9], wherein the positive electrode contains a lithium-containing compound comprising Fe.

[11] The cell pack according to [1] to [10], wherein the negative electrode contains graphite or at least one or more elements selected from the group consisting of Ti, V, Sn, Cr, Mn, Fe, Co, Ni, Zn, Al, Si, and B.

[12] A non-aqueous electrolyte solution comprising an electrolyte salt and a non-aqueous solvent, the non-aqueous electrolyte solution comprising a redox shuttle, wherein the non-aqueous solvent contains 5 to 95% by volume of acetonitrile and a linear carbonate as an amount per total amount;

the redox shuttle comprises a compound represented by general formula (1) below:

[Chem. 2]

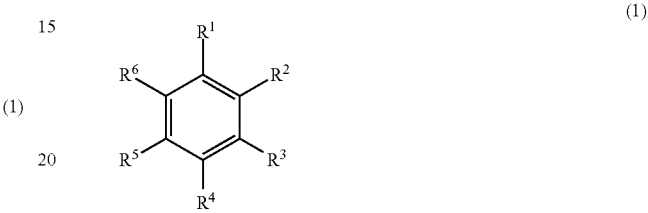

(1)

wherein $R^1$, $R^2$, $R^3$, $R^4$, $R^5$, and $R^6$ represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms;

the compound represented by the general formula (1) is contained in an amount of 0.1 to 20% by mass with respect to a total amount of the non-aqueous electrolyte solution; and the electrolyte salt comprises an imide salt and $LiPF_6$, the imide salt has a content of 0.5 mol to 3 mol per L of the non-aqueous solvent, and $LiPF_6$<the imide salt in molar ratio in the non-aqueous electrolyte solution.

[13] The non-aqueous electrolyte solution according to [12], which has an ionic conductivity of 10 to 50 mS/cm at 25° C.

[14] The non-aqueous electrolyte solution according to [12] or [13], wherein in the non-aqueous solvent, the volume ratio of the acetonitrile is less than the volume ratio of the linear carbonate.

[15] A method for manufacturing a cell pack which comprises non-aqueous secondary cells each comprising a non-aqueous electrolyte solution containing an electrolyte salt and a non-aqueous solvent, a positive electrode, and a negative electrode, comprising the following steps:

forming a laminated body comprising the positive electrode and the negative electrode;

producing the non-aqueous secondary cell in which the laminated body and the non-aqueous electrolyte solution are contained and sealed in a cell outer packaging; and configuring the cell pack such that the cell pack is configured with a module in which two or more of the non-aqueous secondary cells are connected in series or with two or more of the modules connected in parallel, or the cell pack is configured with a module in which two or more of the non-aqueous secondary cells are connected in parallel or with two or more of the modules connected in series, wherein each of the non-aqueous secondary cells constituting the module has a ratio of maximum capacity (B) to minimum capacity (A) of 1.00<B/A<2.00, and the non-aqueous electrolyte solution contains a redox shuttle having a reversible redox potential at a greater electropositive potential than a positive electrode potential at full charge.

[16] The method for manufacturing a cell pack according to [15], wherein each of the non-aqueous secondary cells constituting the module has a capacity of 1 mAh to 100 Ah, and each of the non-aqueous secondary cells has a ratio of maximum capacity (B) to minimum capacity (A) of 1.05<B/A<2.00.

[17] The method for manufacturing a cell pack according to [15] or [16], further comprising initially charging the non-aqueous secondary cells at 0.001 to 0.3 C.

[18] The method for manufacturing a cell pack according to [15] or [16], wherein
the non-aqueous solvent contains 5 to 95% by volume of acetonitrile and a linear carbonate as an amount per total amount;
the redox shuttle comprises a compound represented by general formula (1) below:

[Chem. 3]

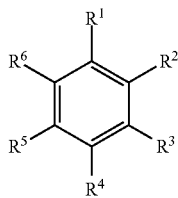

(1)

wherein $R^1$, $R^2$, $R^3$, $R^4$, $R^5$, and $R^6$ represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms;
the compound represented by the general formula (1) is contained in an amount of 0.1 to 20% by mass with respect to a total amount of the non-aqueous electrolyte solution; and
the electrolyte salt comprises an imide salt and $LiPF_6$, the imide salt has a content of 0.5 mol to 3 mol per L of the non-aqueous solvent, and $LiPF_6$<the imide salt in molar ratio in the non-aqueous electrolyte solution.

Advantageous Effects of Invention

According to the present invention, even if the initial capacities of the non-aqueous secondary cells constituting a cell pack are not matched, the imbalance between two or more non-aqueous secondary cells when charged at high current density is eliminated. It is possible to provide a high-capacity cell pack with stable charge/discharge cycling. Further, it is possible to provide a non-aqueous electrolyte solution and a cell pack, wherein capacity difference between two or more non-aqueous secondary cells is eliminated even at low and high temperatures.

DESCRIPTION OF EMBODIMENTS

Figure 1:
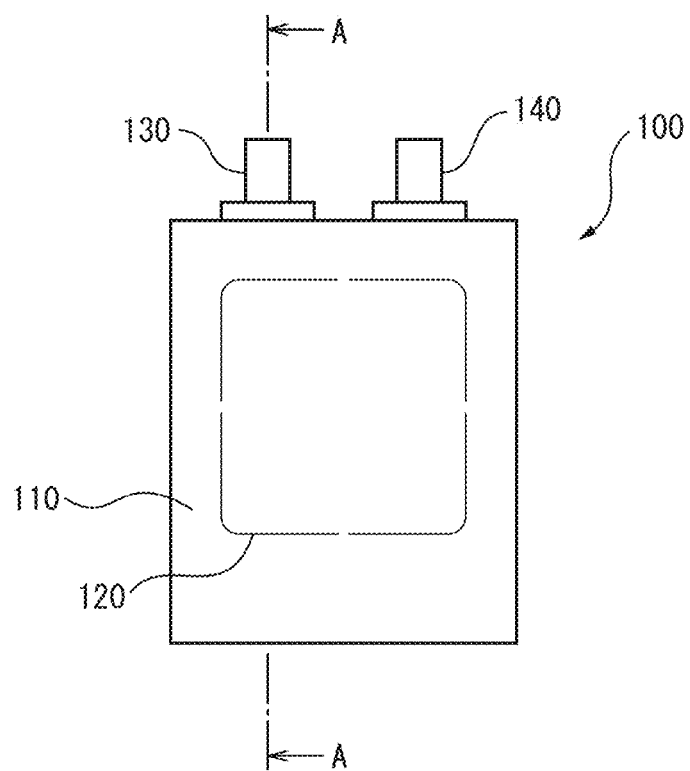
FIG. 1 is a plan view schematically showing one example of the non-aqueous secondary cell of the present embodiment.

Hereinafter, the mode for carrying out the present invention (hereinafter, simply referred to as "the present embodiment") will be described in detail.

One embodiment of the present invention is a cell pack comprising non-aqueous secondary cells each comprising a non-aqueous electrolyte solution containing an electrolyte salt and a non-aqueous solvent, a positive electrode, and a negative electrode, wherein
the cell pack is configured with a module in which two or more of the non-aqueous secondary cells are connected in series or with two or more of the modules connected in parallel, or the cell pack is configured with a module in which two or more of the non-aqueous secondary cells are connected in parallel or with two or more of the modules connected in series;
each of the non-aqueous secondary cells constituting the module has a ratio of maximum capacity (B) to minimum capacity (A) of 1.00<B/A<2.00; and
the non-aqueous electrolyte solution contains a redox shuttle having a reversible redox potential at a greater electropositive potential than a positive electrode potential at full charge.

Another embodiment of the present invention is a non-aqueous electrolyte solution comprising an electrolyte salt and a non-aqueous solvent, the non-aqueous electrolyte solution comprising a redox shuttle, wherein
the non-aqueous solvent contains 5 to 95% by volume of acetonitrile and a linear carbonate as an amount per total amount;
the redox shuttle comprises a compound represented by general formula (1) below:

[Chem. 4]

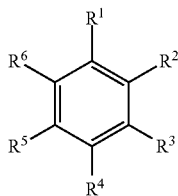

(1)

wherein $R^1$, $R^2$, $R^3$, $R^4$, $R^5$, and $R^6$ represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms;

the compound represented by the general formula (1) is contained in an amount of 0.1 to 20% by mass with respect to a total amount of the non-aqueous electrolyte solution; and the electrolyte salt comprises an imide salt and $LiPF_6$, the imide salt has a content of 0.5 mol to 3 mol per L of the non-aqueous solvent, and $LiPF_6$<the imide salt in molar ratio in the non-aqueous electrolyte solution.

For a numerical range specified using "to" in the present specification, the numerical values specified before and after "to" are encompassed in the numerical range.

In the non-aqueous electrolyte solution or the cell pack of the present embodiment, even if the initial capacities of the non-aqueous secondary cells constituting the cell pack are not matched, the imbalance between the non-aqueous secondary cells when charged at high current density is eliminated, and it is possible to provide a non-aqueous electrolyte solution and a high-capacity cell pack with stable charge/discharge cycling. Further, it is possible to eliminate capacity difference between non-aqueous secondary cells even at low and high temperatures.

Even when a non-aqueous electrolyte solvent aiming for high ionic conductivity is applied, the precipitation of a poorly soluble redox shuttle can be prevented, whereby deterioration due to overcharging is suppressed even in circumstances outside of the control by a BMS, and the yield of the non-aqueous secondary cells is improved. The "non-aqueous electrolyte solution" of the present embodiment refers to a non-aqueous electrolyte solution containing: 1% by mass or less of water with respect to the total amount of the non-aqueous electrolyte solution; an electrolyte salt; a non-aqueous solvent; and a redox shuttle having a reversible redox potential. The non-aqueous electrolyte solution of the present embodiment preferably contains as little water as possible but may contain a trace amount of water as long as the object of the present invention is not inhibited. The content of such water with respect to the total amount of the non-aqueous electrolyte solution is 300 mass ppm or less, more preferably 200 mass ppm or less. For the non-aqueous electrolyte solution, it is possible to apply a material used for a non-aqueous electrolyte solution of conventional lithium-ion cells.

Figure 2:
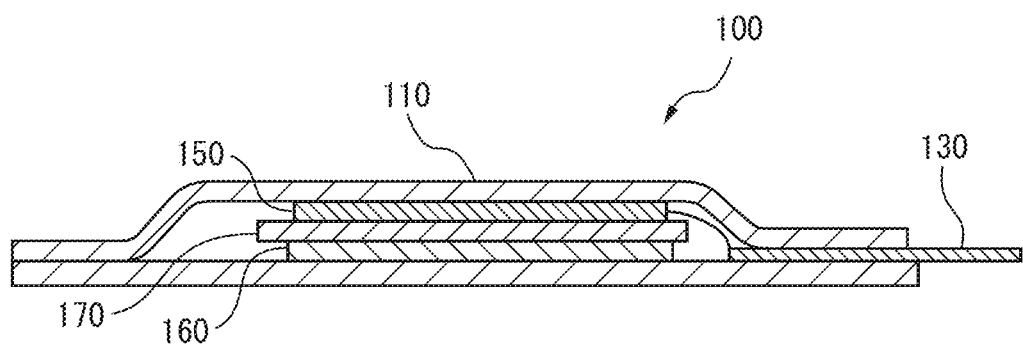
FIG. 2 is a cross-sectional view of FIG. 1 along the A-A line.

The non-aqueous secondary cell of the present embodiment is a secondary cell comprising the above non-aqueous electrolyte solution with a positive electrode and a negative electrode, and may be, for example, a lithium-ion cell, and more specifically, may be the lithium-ion cell schematically shown in the cross-sectional view of FIG. 2. The lithium-ion cell 100 shown in FIGS. 1 and 2 comprises a separator 170, a positive electrode 150 and a negative electrode 160 interposing the separator 170 from both sides, a laminated body thereof (separator 170, positive electrode 150, and negative electrode 160) interposed between a positive electrode current collector 130 (connected to the positive electrode 150) and a negative electrode current collector 140 (connected to the negative electrode 160), and a cell outer packaging 110 housing the above components. The laminated body in which the positive electrode 150, the separator 170, and the negative electrode 160 are laminated is impregnated with the non-aqueous electrolyte solution according to the present embodiment.

<1. Non-Aqueous Electrolyte Solution>

The "non-aqueous electrolyte solution" of the present embodiment refers to an electrolyte solution with 1% by mass or less of water with respect to the total amount of the non-aqueous electrolyte solution. The non-aqueous electrolyte solution according to the present embodiment preferably contains as little water as possible but may contain a trace amount of water as long as the object of the present invention is not inhibited. The content of such water as an amount per total amount of the non-aqueous electrolyte solution is 300 mass ppm or less, preferably 200 mass ppm or less. As long as the non-aqueous electrolyte solution has the composition to achieve the object of the present invention, constituent materials in a known non-aqueous electrolyte solution used in a lithium-ion cell may be appropriately selected and used for other components.

<1-1. Redox Shuttle>

The redox shuttle is a compound having a reversible redox potential, wherein the value of the redox potential is not particularly limited as long as the value is near the overcharge potential to be set. The phrase "having a reversible redox potential" means that an irreversible reaction such as decomposition or polymerization of the compound is unlikely to occur on an electrode, and a reaction in which the compound cycles between the oxidized form and the reduced form thereof occurs. In the present specification, "reversible redox potential" is obtained by cyclic voltammetry (CV) measurement.

The "overcharge potential to be set" depends on the type of positive electrode active material and is determined by each cell manufacturer in a range where an irreversible reaction such as decomposition of a non-aqueous electrolyte solution does not occur. The overcharge potential is often set, for example, in the case of a lithium-ion cell in which $LiCoO_2$ as the positive electrode and graphite as the negative electrode are used, to about 4.2 to 4.4 V; in the case of a lithium-ion cell in which $Li_2Mn_2O_4$ as the positive electrode and graphite as the negative electrode are used, to about 4.0 to 4.2 V; and in the case of a lithium-ion cell in which $LiFePO_4$ as the positive electrode and graphite as the negative electrode are used, to about 3.6 to 3.8 V. Further, "near" is preferably ±0.05 V with respect to the overcharge potential to be set.

The molecular weight of the redox shuttle, from the viewpoint of diffusibility within the non-aqueous electrolyte solution, is preferably 100 to 500, more preferably 120 to 450, and particularly preferably 140 to 400.

As the redox shuttle, specifically, a compound represented by, for example, the following general formula (1) can be used:

[Chem. 5]

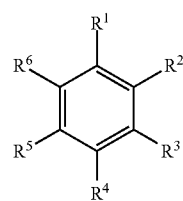

(1)

wherein $R^1$, $R^2$, $R^3$, $R^4$, $R^5$, and $R^6$ (hereinafter, listed as "$R^1$ to $R^6$") represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms.

The halogen atom may be a fluorine atom, a chlorine atom, a bromine atom, or an iodine atom.

Examples of the aryl group include a phenyl group. Examples of the alkyl group having 1 to 4 carbon atoms include a methyl group, an ethyl group, an n-propyl group, an isopropyl group, an n-butyl group, an isobutyl group, and a tert-butyl group. Examples of the fluorine-substituted alkyl group having 1 to 4 carbon atoms include a trifluoromethyl group. Examples of the alkoxy group having 1 to 4 carbon atoms include a methoxy group, an ethoxy group, an n-propoxy group, an isopropoxy group, an n-butoxy group, an isobutoxy group, and a tert-butoxy group. Examples of the fluorine-substituted alkoxy group having 1 to 4 carbon atoms include a monofluoromethoxy group, a difluoromethoxy group, a 2,2,2-trifluoroethoxy group, and a 2,2,3,3-tetrafluoropropoxy group. The substituents may be a combination of any of these substituents.

Among the compounds represented by the above general formula (1), a compound in which, of the substituents represented by $R^1$ to $R^6$, two are tert-butyl groups or trifluoromethyl groups and two are alkoxy groups having 1 to 4 carbon atoms or fluorine-substituted alkoxy groups having 1 to 4 carbon atoms has n electrons protected by steric effects of the tert-butyl groups or trifluoromethyl groups. Since an oxygen atom of the alkoxy group or the fluorine-substituted alkoxy group has an unshared electron pair, the n-conjugated plane does not open even in a redox state and has excellent long-term stability. Specific examples of such a compound are illustrated below.

[Chem 6]

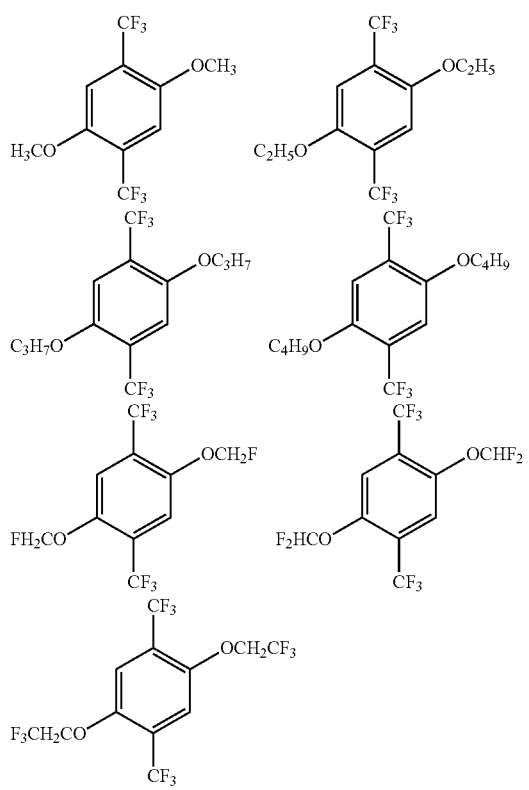

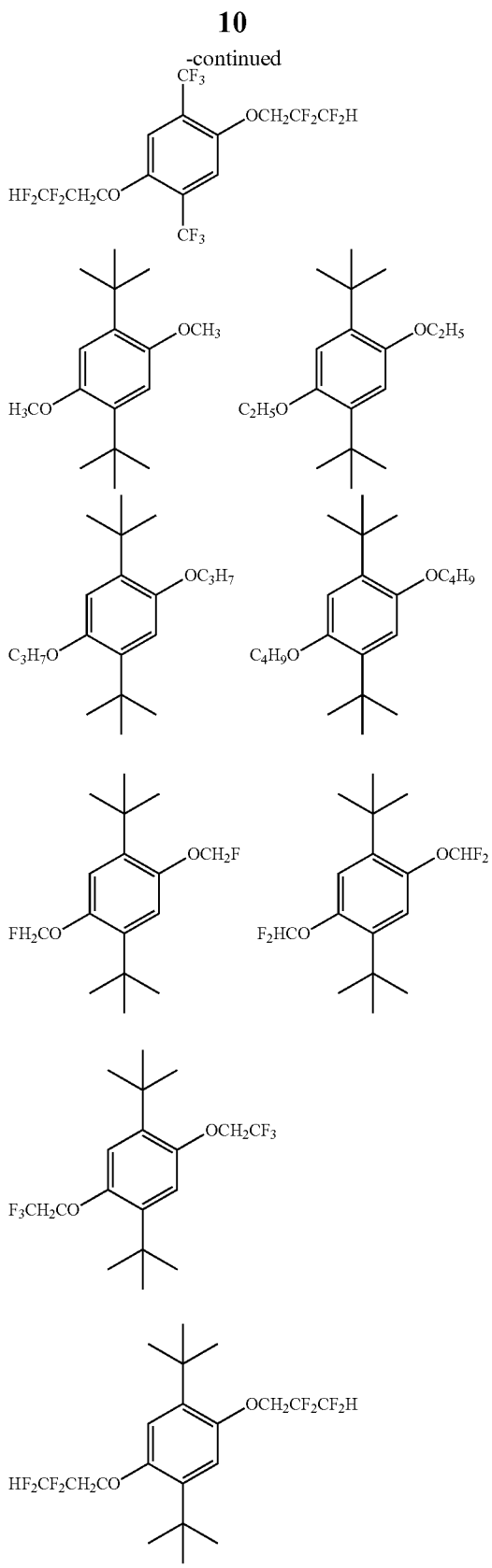

The compound of the specific examples above can be manufactured by a conventional method, for example, any one of the three reaction routes represented by general formulas (2), (3), and (4) below:

[Reaction route 1]
[Chem. 7]

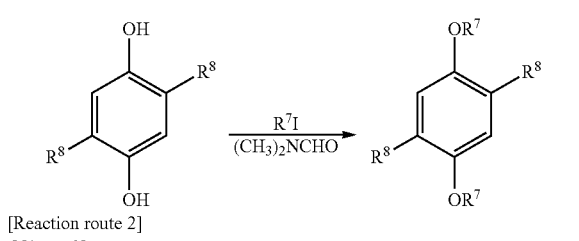

(2)

[Reaction route 2]
[Chem. 8]

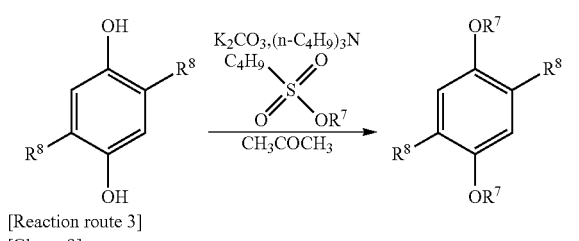

(3)

[Reaction route 3]
[Chem. 9]

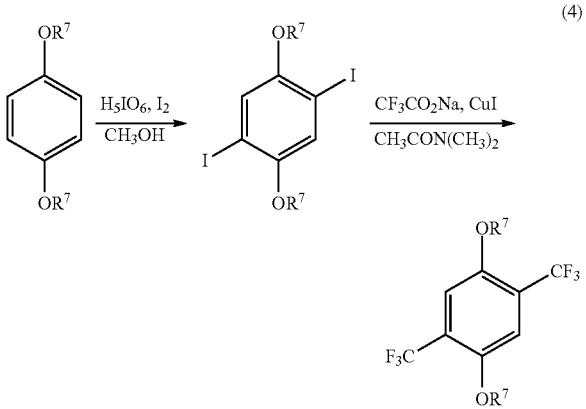

(4)

In the general formulas (2), (3), and (4), the plurality of $R^7$ present in each of the compounds each independently represent an alkyl group having 1 to 4 carbon atoms or a fluorine-substituted alkyl group having 1 to 4 carbon atoms, and the plurality of $R^8$ present in each of the compounds each independently represent a tert-butyl group or a trifluoromethyl group. Examples of the alkyl group having 1 to 4 carbon atoms include a methyl group, an ethyl group, an n-propyl group, an isopropyl group, an n-butyl group, an isobutyl group, and a tert-butyl group. Examples of the fluorine-substituted alkyl group having 1 to 4 carbon atoms include a monofluoromethyl group, a difluoromethyl group, a 2,2,2-trifluoromethyl group, and a 2,2,3,3-tetrafluoropropyl group.

The manufacturing method of reaction route 1 represented by the above general formula (2) will be described.

In reaction route 1, 2,5-bis(tert-butyl)hydroquinone or 2,5-bistrifluoromethyl hydroquinone is mixed with N,N-dimethylformamide, into the mixture thereof is added NaH, and thereafter, an iodide $R^7I$ is added. The reaction solution is separated by an organic solvent such as dichloromethane or salt water, washed with water to recover the organic solvent, and dried with a dehydrating agent added thereto. The dehydrating agent is not particularly limited but is preferably anhydrous sodium sulfate or anhydrous magnesium sulfate. After the solvent is removed, the crude product thus obtained is purified by silica gel column chromatography to obtain the target compound. The developing solvent of the silica gel column chromatography is not particularly limited, and examples thereof include a developing solvent in which chloroform:n-hexane=1:4 (volume ratio).

Next, the manufacturing method of reaction route 2 represented by the above general formula (3) will be described.

In reaction route 2, 2,5-bis(tert-butyl)hydroquinone or 2,5-bistrifluoromethyl hydroquinone is mixed with potassium carbonate, tri-n-butylamine, and acetone under a nitrogen atmosphere, and into the mixture thereof is then dropped a perfluorobutylsulfonic acid ester $C_4F_9SO_3R^7$, for example, 2,2,2-trifluoroethyl perfluorobutylsulfonate. The reaction temperature at this time is not particularly limited but is preferably 40 to 70° C., more preferably 50 to 65° C., and even more preferably 57 to 63° C. Thereafter, water is added to halt the reaction, and acetone is removed by vacuum concentration. After cooling, suction filtration, and drying, the residue thus obtained is purified by silica gel column chromatography to obtain the target compound. The developing solvent of the silica gel column chromatography is not particularly limited, and examples thereof include a developing solvent in which chloroform:n-hexane=1:10 (volume ratio).

Next, the manufacturing method of reaction route 3 represented by the above general formula (4) will be described.

In reaction route 3, methanol is mixed with orthoperiodic acid, and then iodine is added thereto and stirred. In addition, 1,4-dialkoxybenzene or 1,4-di(fluorine-substituted alkoxy)benzene is added thereto and stirred. The reaction temperature at this time is not particularly limited but is preferably 50 to 80° C., more preferably 60 to 75° C., and even more preferably 67 to 73° C. After the reaction is complete, the solution thus obtained is poured into a mixture of $Na_2S_2O_5$ and water, the precipitate therefrom is suction-filtered and dried, and the powder thus obtained is purified by silica gel column chromatography to obtain 2,5-diiodide, an intermediate product. The developing solvent of the silica gel column chromatography is not particularly limited, and examples thereof include dichloromethane.

Under a nitrogen atmosphere, the above intermediate product, sodium trifluoroacetate, copper iodide, and N,N-dimethylacetamide are mixed and refluxed. The reflux temperature is not particularly limited but is preferably 130 to 160° C., more preferably 140 to 155° C., and even more preferably 147 to 153° C. The solution thus obtained is cooled, filtered, and separated by water and an organic solvent such as dichloromethane. Thereafter, the organic solvent is recovered via washing with water, and a dehydrating agent is added to dry the solution. The dehydrating agent is not particularly limited but is preferably anhydrous sodium sulfate or anhydrous magnesium sulfate. After the solvent is removed, the crude product thus obtained is purified by silica gel column chromatography to obtain the target compound. The developing solvent of the silica gel column chromatography is not particularly limited, and examples thereof include dichloromethane.

The content of the redox shuttle in the non-aqueous electrolyte solution of the present embodiment is preferably 0.1 to 20% by mass, more preferably 0.5 to 10% by mass with respect to the total amount of the non-aqueous electrolyte solution. When the content is 0.1% by mass or greater, the effect of overcharge prevention due to the circulating action of the redox reaction can be more effectively obtained. When the content is 20% by mass or less, the degradation of ionic conductivity is small and the effect on cell characteristics such as input/output characteristic and cell life is reduced.

<1-2. Non-Aqueous Solvent>

The "non-aqueous solvent" described in the present embodiment means an element obtained by removing an electrolyte salt, comprising a lithium salt, and various additives from the non-aqueous electrolyte solution. When an electrode protection additive is contained in the non-aqueous electrolyte solution, the "non-aqueous solvent" means an element obtained by removing a lithium salt and additives other than the electrode protection additive from the non-aqueous electrolyte solution. Examples of the non-aqueous solvent include alcohols such as methanol and ethanol; and an aprotic solvent. Among these, the non-aqueous solvent is preferably an aprotic solvent. The non-aqueous solvent may contain a solvent other than an aprotic solvent as long as the object of the present invention is not inhibited.

For example, acetonitrile as the aprotic solvent can be contained in the non-aqueous solvent according to the non-aqueous electrolyte solution. The ionic conductivity of the non-aqueous electrolyte solution is improved by containing acetonitrile in the non-aqueous solvent, and thus it is possible for the diffusibility of lithium ions within the cell to be increased. When acetonitrile is contained in the non-aqueous electrolyte solution, specifically even in a positive electrode in which the positive electrode active material layer is made thicker to increase the filling amount of the positive electrode active material, lithium ions can be satisfactorily diffused to a region near the current collector, which is difficult to achieve for lithium ions when discharging under high load. Thus, it is possible to draw out sufficient capacity even during high-load discharge, and a non-aqueous secondary cell having excellent load characteristic can be obtained.

Since the non-aqueous solvent contains acetonitrile, the fast-charging characteristic of the non-aqueous secondary cell can be enhanced. In constant current (CC)-constant voltage (CV) charging of the non-aqueous secondary cell, the capacity per unit of time in the CC charging period is greater than the charging capacity per unit of time in the CV charging period. When acetonitrile is used in the non-aqueous solvent of the non-aqueous electrolyte solution, the charging current can be increased, in addition to increasing the region capable of CC charging (longer CC charging time). Thus, the time from the start of charging of the non-aqueous secondary cell to a fully charged state can be significantly shortened.

Acetonitrile undergoes electrochemical reductive decomposition easily. Therefore, when acetonitrile is used, it is preferable that another solvent (for example, an aprotic solvent other than acetonitrile) be used in combination with acetonitrile as the non-aqueous solvent and/or an electrode protection additive for forming a protective coating on an electrode be added.

The content of the acetonitrile is preferably 5 to 95% by volume as an amount per total amount of the non-aqueous solvent. The content of the acetonitrile is more preferably 10% by volume or greater, even more preferably 20% by volume or greater, and is more preferably 85% by volume or less, even more preferably 66% by volume or less. When the content of the acetonitrile is 5% by volume or greater as an amount per total amount of the non-aqueous solvent, it tends to be possible for ionic conductivity to increase and high output characteristic to be exhibited, and the dissolution of lithium salt can be promoted. Since the additive described below suppresses the increase of internal resistance of the cell, when the content of the acetonitrile in the non-aqueous solvent is within the above ranges, excellent performance of the acetonitrile is maintained, while it tends to be possible for high-temperature cycling characteristic and other cell characteristics to be improved.

Examples of the aprotic solvent other than acetonitrile include a cyclic carbonate, a fluoroethylene carbonate, a lactone, an organic compound having a sulfur atom, a linear carbonate, a chain fluorinated carbonate, a cyclic ether, a mononitrile other than acetonitrile, an alkoxy group-substituted nitrile, a dinitrile, a cyclic nitrile, a short chain fatty acid ester, a chain ether, a fluorinated ether, a ketone, and a compound in which a portion or all of the H atoms of the aprotic solvent are substituted with halogen atoms.

Examples of the linear carbonate include ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethylvinylene carbonate, and vinyl ethylene carbonate;

examples of the fluoroethylene carbonate include 4-fluoro-1,3-dioxolan-2-one, 4,4-difluoro-1,3-dioxolan-2-one, cis-4,5-difluro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one, and 4,4,5-trifluoro-5-methyl-1,3-dioxolan-2-one;

examples of the lactone include γ-butyrolactone, α-methyl-γ-butyrolactone, γ-valerolactone, γ-caprolactone, δ-valerolactone, δ-caprolactone, and ε-caprolactone;

examples of the organic compound having a sulfur atom include ethylene sulfite, propylene sulfite, butylene sulfite, pentene sulfite, sulfolane, 3-sulfolane, 3-methyl sulfolane, 1,3-propane sultone, 1,4-butane sultone, 1-propene 1,3-sultone, dimethyl sulfoxide, tetramethylene sulfoxide, and ethylene glycol sulfite;

examples of the linear carbonate include ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate, and diisobutyl carbonate;

examples of the cyclic ether include tetrahydrofuran, 2-methyl tetrahydrofuran, 1,4-dioxane, and 1,3-dioxane;

examples of the mononitrile other than acetonitrile include propionitrile, butyronitrile, valeronitrile, benzonitrile, and acrylonitrile;

examples of the alkoxy group-substituted nitrile include methoxyacetonitrile and 3-methoxypropionitrile;

Examples of the dinitrile include malononitrile, succinonitrile, glutaronitrile, adiponitrile, 1-4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, and 2,4-dimethylglutaronitrile;

examples of the cyclic nitrile include benzonitrile;

examples of the short chain fatty acid ester include methyl acetate, methyl propionate, methyl isobutyrate, methyl butyrate, methyl isovalerate, methyl valerate, methyl pivalate, methyl hydroangelate, methyl caproate, ethyl acetate, ethyl propionate, ethyl isobutyrate, ethyl butyrate, ethyl isovalerate, ethyl valerate, ethyl pivalate, ethyl hydroangelate, ethyl caproate, propyl acetate, propyl propionate, propyl isobutyrate, propyl butyrate, propyl isovalerate, propyl valerate, propyl pivalate, propyl hydroangelate, propyl caproate, isopropyl acetate, isopropyl propionate, isopropyl isobutyrate, isopropyl butyrate, isopropyl isovalerate, isopropyl valerate, isopropyl pivalate, isopropyl hydroangelate, isopropyl caproate, butyl acetate, butyl propionate, butyl isobutyrate, butyl butyrate, butyl isovalerate, butyl valerate, butyl pivalate, butyl hydroangelate, butyl caproate, isobutyl acetate, isobutyl propionate, isobutyl isobutyrate, isobutyl butyrate, isobutyl isovalerate, isobutyl valerate, isobutyl pivalate, isobutyl hydroangelate, isobutyl caproate, tert-butyl acetate, tert-butyl propionate, tert-butyl isobutyrate, tert-butyl butyrate, tert-butyl isovalerate, tert-butyl valerate, tert-butyl pivalate, tert-butyl hydroangelate, and tert-butyl caproate;

examples of the chain ether include dimethoxyethane, diethyl ether, 1,3-dioxolane, diglyme, triglyme, and tetraglyme;

examples of the fluorinated ether include $Rf^{20}$—$OR^{21}$ ($Rf^{20}$ is an alkyl group containing a fluorine atom, and $R^7$ is an organic group which may contain a fluorine atom);

examples of the ketone include acetone, methyl ethyl ketone, and methyl isobutyl ketone; and examples of the compound in which a portion or all of the H atoms of the aprotic solvent are substituted with halogen atoms include a compound in which the halogen atoms are fluorine.

Examples of fluorides of the linear carbonate include methyl trifluoroethyl carbonate, trifluorodimethyl carbonate, trifluorodiethyl carbonate, trifluoroethylmethyl carbonate, methyl 2,2-difluoroethyl carbonate, methyl 2,2,2-trifluoroethyl carbonate, and methyl 2,2,3,3-tetrafluoropropyl carbonate. The above fluorinated linear carbonate can be represented by the following general formula:

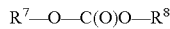

$R^7$—O—C(O)O—$R^8$ wherein $R^7$ and $R^8$ are at least one selected from the group consisting of $CH_3$, $CH_2CH_3$, $CH_2CH_2CH_3$, $CH(CH_3)_2$, and $CH_2Rf^9$; $Rf^9$ is an alkyl group having 1 to 3 carbon atoms in which at least one hydrogen atom is substituted with a fluorine atom; and $R^7$ and/or $R^8$ contain at least one fluorine atom.

Fluorides of the short chain fatty acid ester include fluorinated short chain fatty acid esters typified by 2,2-difluoroethyl acetate, 2,2,2-trifluoroethyl acetate, and 2,2,3,3-tetrafluoropropyl acetate. The fluorinated short chain fatty acid ester can be represented by the following general formula:

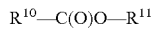

$R^{10}$—C(O)O—$R^{11}$ wherein $R^{10}$ is at least one selected from the group consisting of $CH_3$, $CH_2CH_2$, $CH_2CH_2CH_3$, $CH(CH_3)_2$, $CF_3CF_2H$, $CFH_2$, $CF_2Rf^{12}$, $CFHRf^{12}$, and $CH_2Rf^{13}$; $R^{11}$ is at least one selected from the group consisting of $CH_3$, $CH_2CH_3$, $CH_2CH_2CH_3$, $CH(CH_3)_2$, and $CH_2Rf^{13}$; $Rf^{12}$ is an alkyl group having 1 to 3 carbon atoms in which at least one hydrogen atom may be substituted with a fluorine atom; $Rf^{13}$ is an alkyl group having 1 to 3 carbon atoms in which at least one hydrogen atom may be substituted with a fluorine atom; and $R^{10}$ and/or $R^{11}$ contain at least one fluorine atom, and when $R^{10}$ is $CF_2H$, $R^{11}$ is not $CH_3$.

For the aprotic solvent other than acetonitrile in the present embodiment, one thereof can be used alone, or two or more thereof may be used in combination. The aprotic solvent other than acetonitrile is preferably 5 to 95% by volume as an amount per total amount of the non-aqueous solvent. The aprotic solvent other than acetonitrile is more preferably 15% by volume or greater, or even more preferably 34% by volume or greater, as an amount per total amount of the non-aqueous solvent, and is more preferably 90% by volume or less, or even more preferably 80% by volume or less. When the content of the acetonitrile is 5% by volume or greater as an amount per total amount of the non-aqueous solvent, it tends to be possible for ionic conductivity to increase and high output characteristic to be exhibited, and the dissolution of lithium salt can be promoted. When the content of the acetonitrile is 95% by volume or less as an amount per total amount of the non-aqueous solvent, excellent performance of the acetonitrile is maintained, while it tends to be possible for high-temperature cycling characteristic and other cell characteristics to be improved.

Note that the ratio of the acetonitrile or the aprotic solvent other than acetonitrile in the non-aqueous solvent can be measured by gas chromatography mass spectrometry (GC/MS).

For the non-aqueous solvent in the present embodiment, it is preferable to use acetonitrile in combination with one or more of a cyclic carbonate and a linear carbonate from the viewpoint of improving the stability of the non-aqueous electrolyte solution. From this viewpoint, it is more preferable for the non-aqueous solvent in the present embodiment to use acetonitrile in combination with a cyclic carbonate, and even more preferable to use acetonitrile with both a cyclic carbonate and a linear carbonate.

When acetonitrile is used with a cyclic carbonate, the cyclic carbonate particularly preferably includes ethylene carbonate, vinylene carbonate, and/or fluoroethylene carbonate.

It is preferable that acetonitrile and a linear carbonate be included as the non-aqueous solvent since the precipitation of the poorly soluble redox shuttle can be prevented. Further, when the volume ratio of acetonitrile in the non-aqueous solvent is less than the volume ratio of the linear carbonate, it is preferable that the function of the redox shuttle be effectively demonstrated even at low temperature.

<1-3. Electrolyte Salt>

The non-aqueous electrolyte solution of the present embodiment is not particularly limited as long as the lithium salt is not limited above. For example, in the present embodiment, the lithium salt comprises $LiPF_6$ or an imide salt.

The imide salt is a lithium salt represented by $LiN(SO_2C_mF_{2m+1})_2$, wherein m is an integer of 0 to 8. Specifically, the imide salt preferably comprises at least one of $LiN(SO_2F)_2$ and $LiN(SO_2CF_3)_2$. Only one or both of these imide salts may be contained, or an imide salt other than these imide salts may be contained.

When the non-aqueous solvent contains acetonitrile, the saturation concentration of the imide salt with respect to the acetonitrile is higher than the saturation concentration of $LiPF_6$. It is thus preferable that the imide salt be contained at a molar concentration of $LiPF_6$ the imide salt so that the aggregation and precipitation of the lithium salt and acetonitrile at low temperature can be suppressed. It is more preferable that the imide salt be contained at a molar concentration, where $LiPF_6$<the imide salt, since a more remarkable effect can be obtained. The content of the imide salt is preferably 0.5 mol to 3 mol, more preferably 1 mol to 2 mol per L of the non-aqueous solvent from the viewpoint of ion supply. According to the acetonitrile-containing non-aqueous electrolyte solution containing at least one of $LiN(SO_2F)_2$ and $LiN(SO_2CF_3)_2$, the reduction of ionic conductivity in the low temperature region of −10° C. or −30° C. can be effectively suppressed, and excellent low-temperature characteristic can be obtained. By limiting the content as such, it is possible to more effectively suppress the increase in resistance during high-temperature heating.

The lithium salt may include a fluorine-containing inorganic lithium salt other than $LiPF_6$, and may include a fluorine-containing inorganic lithium salt such as $LiBF_4$, $LiAsF_6$, $Li_2SiF_6$, $LiSbF_6$, or $Li_2B_{12}F_bH_{12-b}$ wherein b is an integer of 0 to 3. The "inorganic lithium salt" means a lithium salt soluble in acetonitrile, in which the anion does not comprise a carbon atom. The "fluorine-containing inorganic lithium salt" means a lithium salt soluble in acetonitrile, in which the anion does not comprise a carbon atom but comprises a fluorine atom. The fluorine-containing inorganic lithium salt is excellent in forming a passivation film on a surface of the metal foil acting as the positive electrode current collector and suppressing corrosion of the positive electrode current collector. The fluorine-containing inorganic lithium salts can be used alone or in a combination of two or more. As the fluorine-containing inorganic lithium salt, compounds which are double salts of LiF and a Lewis acid are desirable. Among these, when a fluorine-containing inorganic lithium salt having a phosphorus atom is used, it facilitates the release of a free fluorine atom and is thus more preferable. A typical fluorine-containing inorganic lithium salt is $LiPF_6$, which releases a $PF_6$ anion when dissolved. A fluorine-containing inorganic lithium salt having a boron atom, when used as the fluorine-containing inorganic lithium salt, facilitates the capture of an excess free acid component that may cause cell deterioration and is thus preferable. From this viewpoint, $LiBF_4$ is particularly preferable.

The content of the fluorine-containing inorganic lithium salt in the non-aqueous electrolyte solution of the present embodiment is not particularly limited but is preferably 0.01 mol or greater, more preferably 0.02 mol or greater, and even more preferably 0.03 mol or greater with respect to 1 L of the non-aqueous solvent. When the content of the fluorine-containing inorganic lithium salt is within the ranges described above, it tends to be possible for ionic conductivity to increase and high output characteristic to be exhibited. Further, the content thereof is preferably less than 1.5 mol, more preferably less than 0.5 mol, and even more preferably less than 0.1 mol with respect to 1 L of the non-aqueous solvent. When the content of the fluorine-containing inorganic lithium salt is within the ranges described above, it tends to be possible for ionic conductivity to increase and high output characteristic to be exhibited, and for the degradation of ionic conductivity due to an increase in viscosity at lower temperature to be suppressed. While excellent performance of the non-aqueous electrolyte solution is maintained, it tends to be possible for high-temperature cycling characteristic and other cell characteristics to be improved.

The non-aqueous electrolyte solution of the present embodiment may further contain an organolithium salt. The "organolithium salt" means a lithium salt soluble in acetonitrile, in which the anion comprises a carbon atom.

Examples of the organolithium salt can include an organolithium salt having an oxalic acid group. Specific examples of the organolithium salt having an oxalic acid group include organolithium salts such as $LiB(C_2O_4)_2$, $LiBF_2(C_2O_4)$, $LiPF_4(C_2O_4)$, and $LiPF_4(C_2O_4)_2$. Among these, at least one lithium salt selected from lithium salts such as $LiB(C_2O_4)_2$ and $LiBF_2(C_2O_4)$ is preferable. Using one or more of these in combination with a fluorine-containing organolithium salt is more preferable. The organolithium salt having an oxalic acid group may be added to the non-aqueous electrolyte solution or contained in the negative electrode (negative electrode active material layer).

The amount of the organolithium salt having an oxalic acid group added to the non-aqueous electrolyte solution, from the viewpoint of ensuring more satisfactory effect from the use thereof, is preferably 0.005 mol or greater, more preferably 0.02 mol or greater, and even more preferably 0.05 mol or greater as the amount per L of the non-aqueous solvent in the non-aqueous electrolyte solution. However, there is a risk of precipitation when the amount of the organolithium salt having an oxalic acid group in the non-aqueous electrolyte solution is excessive. Thus, the amount of the organolithium salt having an oxalic acid group added to the non-aqueous electrolyte solution is preferably less than 1.0 mol, more preferably less than 0.5 mol, and even more preferably less than 0.2 mol in an amount per L of the non-aqueous solvent in the non-aqueous electrolyte solution.

Organolithium salts having an oxalic acid group are known to be poorly soluble in weakly polar organic solvents, particularly linear carbonates. An organolithium salt having an oxalic acid group may contain a trace amount of lithium oxalate. Even when mixed as a non-aqueous electrolyte solution, the organolithium salt reacts with trace amount of water contained in another raw material, and a white precipitate of lithium oxalate may be newly generated. As such, the content of lithium oxalate in the non-aqueous electrolyte solution of the present embodiment is not particularly limited but is preferably 0 to 500 ppm.

As the lithium salt in the present embodiment, in addition to the above, a lithium salt generally used for a non-aqueous secondary cell may be supplementarily added. Specific examples of the other lithium salt include inorganic lithium salts in which the anion does not comprise a fluorine atom, such as $LiClO_4$, $LiAlO_4$, $LiAlCl_4$, $LiB_{10}C_{10}$, and chloroborane Li; organolithium salts such as $LiCF_3SO_3$, $LiCF_3CO_2$, $Li_2C_2F_4(SO_3)_2$, $LiC(CF_3SO_2)_3$, $LiC_nF_{(2n+1)}SO_3$ (n≥2), lower aliphatic carboxylate Li, tetraphenylborate Li, and $LiB(C_3O_4H_2)_2$; organolithium salts represented by $LiPF_n(C_pF_{2p+1})_{6-n}$ wherein n is an integer of 1 to 5 and p is an integer of 1 to 8, such as $LiPF_5(CF_3)$; organolithium salts represented by $LiBF_q(C_sF_{2s+1})_{4-q}$ wherein q is an integer of 1 to 3 and s is an integer of 1 to 8, such as $LiBF_3(CF_3)$; lithium salts bonded to a multivalent anion; and organolithium salts each represented by the following general formula (A):

$$LiC(SO_2R^A)(SO_2R^B)(SO_2R^C) \quad (A)$$

wherein $R^A$, $R^B$, and $R^C$ may be the same or different from each other and represent a perfluoroalkyl group having 1 to 8 carbon atoms, the following general formula (B):

$$LiN(SO_2OR^D)(SO_2OR^E) \quad (B)$$

wherein $R^D$ and $R^E$ may be the same or different from each other and represent a perfluoroalkyl group having 1 to 8 carbon atoms, and the following general formula (C):

$$LiN(SO_2R^F)(SO_2OR^G) \quad (C)$$

wherein $R^F$ and $R^G$ may be the same or different from each other and represent a perfluoroalkyl group having 1 to 8 carbon atoms. One or more of these can be used in combination with the fluorine-containing inorganic lithium salt.

<1-4. Additive>
<Electrode Protection Additive>

The non-aqueous electrolyte solution of the present embodiment may contain an additive that protects the electrodes. The electrode protection additive is not particularly limited as long as the object of the present invention is not inhibited, and may substantially overlap with a substance (i.e., the non-aqueous solvent described above) that acts as a solvent which dissolves the lithium salt. The electrode protection additive is preferably a substance that contributes to improving the performance of the non-aqueous electrolyte solution and the non-aqueous secondary cell in the present embodiment, but also encompasses substances that are not directly involved in the electrochemical reaction.

Specific examples of the electrode protection additive include fluoroethylene carbonates typified by 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one, and 4,4,5-trifluoro-5-methyl-1,3-dioxolan-2-one; cyclic carbonates containing an unsaturated bond typified by vinylene carbonate, 4,5-dimethylvinylene carbonate, and vinyl ethylene carbonate; lactones typified by γ-butyrolactone, γ-valerolactone, γ-caprolactone, δ-valerolactone, δ-caprolactone, and ε-caprolactone; cyclic ethers typified by 1,4-dioxane; cyclic sulfur compounds typified by ethylene sulfite, propylene sulfite, butylene sulfite, pentene sulfite, sulfolane, 3-sulfolane, 3-methylsulfolane, 1,3-propanesultone, 1,4-butanesultone, 1-propene 1,3-sultone, and tetramethylene sulfoxide; chain acid anhydrides typified by acetic anhydride, propionic anhydride, and benzoic anhydride; cyclic anhydrides typified by malonic anhydride, succinic anhydride, glutaric anhydride, maleic anhydride, phthalic anhydride, 1,2-cyclohexanedicarboxylic anhydride, 2,3-naphthalenedicarboxylic anhydride, and naphthalene-1,4,5,8-tetracarboxylic dianhydride; and mixed acid anhydrides having a structure in which different acids, such as two different carboxylic acids, or a carboxylic acid and a sulfonic acid, are dehydrated and condensed. The electrode protection additives can be used alone or in a combination of two or more.

The content of the electrode protection additive in the non-aqueous electrolyte solution of the present embodiment is not particularly limited but is preferably 0.1 to 30% by volume, more preferably 0.3 to 15% by volume, and even more preferably 0.5 to 4% by volume as the content of the electrode protection additive with respect to the total amount of the non-aqueous solvent.

In the present embodiment, the higher the content of the electrode protection additive, the more the deterioration of the non-aqueous electrolyte solution can be suppressed. However, the lower the content of the electrode protection additive, the more the high output characteristic of the non-aqueous secondary cell in a low-temperature environment are improved. Therefore, by adjusting the content of the electrode protection additive within the ranges described above, it tends to be possible for the excellent performance based on high ionic conductivity of the non-aqueous electrolyte solution to be maximized, without impairing the basic functions of the non-aqueous secondary cell. By preparing a non-aqueous electrolyte solution with such a composition, it tends to be possible for the cycling performance, the high output performance in a low-temperature environment, and all the other cell characteristics of the non-aqueous secondary cell to be further improved.

Since acetonitrile, which is one component of the non-aqueous solvent, undergoes electrochemical reductive decomposition easily, the non-aqueous solvent containing acetonitrile preferably includes one or more cyclic aprotic solvents as an electrode protection additive for forming a protective coating on a negative electrode, and more preferably includes one or more cyclic carbonates containing an unsaturated bond.

The cyclic carbonate containing an unsaturated bond is preferably vinylene carbonate. The content of vinylene carbonate in the non-aqueous electrolyte solution is preferably 0.1% by volume to 10% by volume, more preferably 0.2% by volume to 5% by volume, and even more preferably 0.5% by volume to 3% by volume. Accordingly, low-temperature durability can be more effectively improved, and it is possible to provide a secondary cell with excellent low-temperature performance.

Vinylene carbonate as an electrode protection additive suppresses the reductive decomposition reaction of acetonitrile on the negative electrode surface, and is thus often indispensable. When the additive is insufficient, cell performance may degrade sharply. However, excessive coating formation leads to degradation of low-temperature performance. By adjusting the addition amount of vinylene carbonate to within the above ranges, interface (coating) resistance can be suppressed to a low level, and cycling deterioration at low temperature can be suppressed.

<Other Optional Additives>

In the present embodiment, for the purpose of improving the charge/discharge cycling characteristic and enhancing the high-temperature storability and safety (for example, overcharge prevention) of the non-aqueous secondary cell, an optional additive selected from, for example, sulfonic acid esters, diphenyl sulfide, cyclohexylbenzene, biphenyl, fluorobenzene, tert-butyl benzene, phosphoric acid esters (ethyl diethylphosphonoacetate (EDPA): $(C_2H_5O)_2(P=O)-CH_2(C=O)OC_2H_5$, tris(trifluoroethyl)phosphate (TFEP): $(CF_3CH_2O)_3P=O$, triphenyl phosphate (TPP): $(C_6H_5O)_3P=O$: $(CH_2=CHCH_2O)_3P=O$, triallyl phosphate, etc.), nitrogen-containing cyclic compounds with no steric hindrance around unshared electron pairs (pyridine, 1-methyl-1H-benzotriazole, 1-methylpyrazole, etc.), and derivatives of these compounds can be appropriately contained in the non-aqueous electrolyte solution. Specifically, phosphoric acid esters have the effect of suppressing side reactions during storage and are thus effective.

The content of the optional additive in the present embodiment is calculated using mass percentage with respect to the total mass of all components constituting the non-aqueous electrolyte solution. The content of the optional additive is not particularly limited, and is preferably within the range of 0.01% by mass to 10% by mass, more preferably 0.02% by mass to 5% by mass, and even more preferably 0.05 to 3% by mass with respect to the total amount of the non-aqueous electrolyte solution. By adjusting the content of the optional additive within the above ranges, it tends to be possible to add even more satisfactory cell characteristics without impairing the basic functions of the non-aqueous secondary cell.

<2. Positive Electrode and Positive Electrode Current Collector>

The positive electrode 150 is composed of a positive electrode active material layer produced from a positive electrode mixture and a positive electrode current collector. The positive electrode 150 is not particularly limited as long as it acts as a positive electrode of a non-aqueous secondary cell, and may be a well-known positive electrode. In view of the excellent redox shuttle long-term durability, the positive electrode in the present invention preferably contains a lithium-containing compound that comprises Fe.

The positive electrode active material layer contains a positive electrode active material and preferably further comprises a conductive aid and a binder as needed.

The positive electrode active material layer preferably contains a material capable of occluding and releasing lithium ions as a positive electrode active material. Such a material is preferably used since it tends to be possible to obtain high voltage and high energy density.

The positive electrode active material may be a positive electrode active material containing at least one transition metal element selected from the group consisting of, for example, Ni, Mn, and Co, and is preferably at least one Li-containing metal oxide selected from Li-containing metal oxides represented by the following general formula (a):

$$Li_p Ni_q Co_r Mn_s M_t O_u \tag{a}$$

wherein M is at least one metal selected from the group consisting of Al, Sn, In, Fe, V, Cu, Mg, Ti, Zn, Mo, Zr, Sr, and Ba; $0<p<1.3$, $0<q<1.2$, $0<r<1.2$, $0\leq s<0.5$, $0\leq t<0.3$, $0.7\leq q+r+s+t\leq 1.2$, and $1.8<u<2.2$; and p is a value determined by the charging/discharging state of the cell.

Specific examples of the positive electrode active material include lithium cobalt oxides typified by $LiCoO_2$; lithium manganese oxides typified by $LiMnO_2$, $LiMn_2O_4$, and $Li_2Mn_2O_4$; lithium nickel oxides typified by $LiNiO_2$; and lithium-containing composite metal oxides represented by $Li_zMO_2$ (M includes at least one transition metal element selected from the group consisting of Ni, Mn, and Co and represents two or more metal elements selected from the group consisting of Ni, Mn, Co, Al, and Mg, and z represents a number greater than 0.9 and less than 1.2) and typified by $LiNi_{1/3}Co_{1/3}Mn_{1/3}O_2$, $LiNi_{0.5}Co_{0.2}Mn_{0.3}O_2$, and $LiNi_{0.8}Co_{0.2}O_2$.

Specifically, the case in which the Ni content ratio q of a Li-containing metal oxide represented by the general formula (a) is $0.5<q<1.2$ is preferable because a reduction in the amount of Co, which is a rare metal, used and high energy densification can both be achieved. Examples of such a positive electrode material include lithium-containing composite metal oxides typified by $LiNi_{0.6}Co_{0.2}Mn_{0.2}O_2$, $LiNi_{0.75}Co_{0.15}Mn_{0.15}O_2$, $LiNi_{0.8}Co_{0.1}Mn_{0.1}O_2$, $LiNi_{0.85}Co_{0.075}Mn_{0.075}O_2$, $LiNi_{0.8}Co_{0.15}Al_{0.05}O_2$, $LiNi_{0.81}Co_{0.1}Al_{0.09}O_2$, and $LiNi_{0.85}Co_{0.1}Al_{0.05}O_2$.

However, as the Ni content ratio increases, there is a tendency for deterioration to progress at low voltage. An active site that deteriorates the non-aqueous electrolyte solution oxidatively is substantially present in the positive electrode active material of the Li-containing metal oxide represented by the general formula (a). This active site may unintentionally consume compounds added to protect the negative electrode on the positive electrode side. Among these compounds, acid anhydrides tend to be easily affected. Specifically, when acetonitrile is contained as a non-aqueous solvent, the addition of an acid anhydride has a significant effect. Thus, there is a critical issue that the acid anhydride is consumed on the positive electrode side.

These additive decomposition products taken in and deposited on the positive electrode side not only cause an increase in the internal resistance of the non-aqueous secondary cell, but also accelerate the deterioration of the lithium salt. Further, the protection of the negative electrode surface, which was the original purpose, becomes insufficient. In order to inactivate the active site that substantially deteriorates the non-aqueous electrolyte solution oxidatively, it is important to control the Jahn-Teller strain or for the components that act as neutralizing agents to coexist. Therefore, the positive electrode active material preferably contains at least one metal selected from the group consisting of Al, Sn, In, Fe, V, Cu, Mg, Ti, Zn, Mo, Zr, Sr, and Ba.

For the same reason, the surface of the positive electrode active material is preferably covered with a compound containing at least one metal element selected from the group consisting of Zr, Ti, Al, and Nb. More preferably, the surface of the positive electrode active material is covered with an oxide containing at least one metal element selected from the group consisting of Zr, Ti, Al, and Nb. Further, the surface of the positive electrode active material is particularly preferably covered with at least one oxide selected from the group consisting of $ZrO_2$, $TiO_2$, $Al_2O_3$, $NbO_3$, and $LiNbO_2$ because the permeation of lithium ions is not inhibited.

The positive electrode active material may be a lithium-containing compound other than the Li-containing metal oxide represented by the general formula (a), and is not particularly limited as long as lithium is contained therein. Examples of such a lithium-containing compound include a composite oxide comprising lithium and a transition metal element, a metal chalcogenide containing lithium, a metal phosphate compound comprising lithium and a transition metal element, and a metal silicate compound comprising lithium and a transition metal element. From the viewpoint of obtaining higher voltage, the lithium-containing compound is preferably a metal phosphate compound comprising, specifically, lithium and at least one transition metal element selected from the group consisting of Co, Ni, Mn, Fe, Cu, Zn, Cr, V, and Ti.

More specifically, examples of the lithium-containing compound include compounds represented by each of the following formula (Xa):

$$Li_v M^I D_2 \tag{Xa}$$

wherein D represents a chalcogen element, $M^I$ represents one or more transition metal elements including at least one transition metal element, v is a value determined by the charging/discharging state of the cell and represents a number of 0.05 to 1.10, and u represents a number of 0 to 2, the following formula (Xb):

$$Li_w M^{II} PO_4 \tag{Xb}$$

wherein D represents a chalcogen element, $M^{II}$ represents one or more transition metal elements including at least one transition metal element, w is a value determined by the charging/discharging state of the cell and represents a number of 0.05 to 1.10, and u represents a number of 0 to 2, and the following formula (Xc):

$$Li_t M^{III}_u SiO_4 \tag{Xc}$$

wherein D represents a chalcogen element, $M^{III}$ represents one or more transition metal elements including at least one transition metal element, t is a value determined by the charging/discharging state of the cell and represents a number of 0.05 to 1.10, and u represents a number of 0 to 2.

The lithium-containing compound represented by the formula (Xa) described above has a layered structure, and the compounds represented by the formulas (Xb) and (Xc) described above have an olivine structure. For the purpose of stabilizing the structures, these lithium-containing compounds may be compounds in which the transition metals are partially substituted with Al, Mg, or another transition metal, in which these metal elements are included in the grain boundaries, in which the oxygen atoms are partially substituted with fluorine atoms, or in which at least a portion of the positive electrode active material surface is covered by another positive electrode active material.

As the positive electrode active material in the present embodiment, a lithium-containing compound as described above may be used alone, or the lithium-containing compound may be used in combination with another positive electrode active material.

Examples of such other positive electrode active material include metal oxides or metal chalcogenides having a tunnel structure or a layered structure, sulfur, and conductive polymers. Examples of a metal oxide or metal chalcogenide having a tunnel structure or a layered structure include oxides of metals other than lithium, sulfides, and selenides, typified by $MnO_2$, $FeO_2$, $FeS_2$, $V_2O_5$, $V_6O_{13}$, $TiO_2$, $TiS_2$, $MoS_2$, and $NbSe_2$. Examples of the conductive polymer include conductive polymers typified by polyaniline, polythiophene, polyacetylene, and polypyrrole.

The other positive electrode active material described above can be used alone or in combination of two or more, and is not particularly limited. However, since it is possible for lithium ions to be reversibly and stably occluded and released, and high energy density can be achieved, the positive electrode active material layer preferably contains at least one transition metal element selected from Ni, Mn, and Co.

When a lithium-containing compound and another positive electrode active material are used in combination as the positive electrode active material, as the use ratio of both thereof, the use ratio of the lithium-containing compound with respect to all parts of the positive electrode active material is preferably 80% by mass or greater, more preferably 85% by mass or greater.

Examples of the conductive aid include carbon blacks typified by graphite, acetylene black, and Ketjen black; and carbon fiber. The content ratio of the conductive aid is preferably 10 parts by mass or less, more preferably 1 to 5 parts by mass with respect to 100 parts by mass of the positive electrode active material.

Examples of the binder include polyvinylidene fluoride (PVDF), polytetrafluoroethylene (PTFE), polyacrylic acid, styrene-butadiene rubber, and fluororubber. The content ratio of the binder is preferably 6 parts by mass or less, more preferably 0.5 to 4 parts by mass with respect to 100 parts by mass of the positive electrode active material.

The positive electrode active material layer is formed by coating a positive electrode mixture-containing slurry in which a positive electrode mixture, obtained by mixing the positive electrode active material and, as needed, the conductive aid and the binder, is dispersed in a solvent on a positive electrode current collector and drying (removing the solvent) the slurry, and then pressing as needed. The solvent is not particularly limited, and a conventionally known solvent can be used. Examples thereof include N-methyl-2-pyrrolidone, dimethylformamide, dimethylacetamide, and water.

The positive electrode current collector is composed of a metal foil, for example, an aluminum foil, a nickel foil, or a stainless-steel foil. The positive electrode current collector may be carbon-coated on the surface or processed into a mesh form. The thickness of the positive electrode current collector is preferably 5 to 40 μm, more preferably 7 to 35 μm, and even more preferably 9 to 30

For the non-aqueous secondary cell in the present embodiment, the basis weight of the positive electrode active material layer contained in the positive electrode is preferably adjusted to the range of 15 to 100 mg/cm². From the viewpoint of improving volumetric energy density while maintaining a balance with output performance of the non-aqueous secondary cell, the basis weight is preferably 24 to 100 mg/cm², more preferably 25 to 80 mg/cm², and even more preferably 26 to 60 mg/cm². Since the non-aqueous secondary cell in the present embodiment can use an electrolyte solution having an ionic conductivity of 10 mS/cm or greater, a non-aqueous secondary cell realizing high output performance can be provided even when the positive electrode active material layer is designed to have high volumetric energy density.

<3. Negative Electrode and Negative Electrode Current Collector>

The negative electrode 160 is composed of a negative electrode active material layer produced from a negative electrode mixture and a negative electrode current collector. The negative electrode 160 can act as a negative electrode of a non-aqueous secondary cell.

The negative electrode active material layer contains a negative electrode active material and preferably further comprises a conductive aid and a binder as needed.

Examples of the negative electrode active material include carbon materials typified by amorphous carbon (hard carbon), artificial graphite, natural graphite, graphite, pyrolytic carbon, coke, glassy carbon, sintered body of an organic polymer compound, mesocarbon microbeads, carbon fiber, activated charcoal, graphite, carbon colloid, and carbon black; metallic lithium, metal oxides, metal nitrides, lithium alloys, tin alloys, silicon alloys, intermetallic compounds, organic compounds, inorganic compounds, metal complexes, and organic polymer compounds. The negative electrode active materials can be used alone or in combination of two or more.

The negative electrode active material layer preferably contains a material capable of occluding lithium ions at a potential lower than 0.4 V vs. $Li/Li^+$ as the negative electrode active material from the viewpoint of increasing cell voltage.

The negative electrode preferably contains graphite or at least one or more elements selected from the group consisting of Ti, V, Sn, Cr, Mn, Fe, Co, Ni, Zn, Al, Si, and B from the viewpoint of energy density. More preferably, the negative electrode contains graphite from the viewpoint of electrochemical stability.

Examples of the conductive aid include carbon blacks typified by graphite, acetylene, and Ketjen black; and carbon fiber. The content ratio of conductive aid is preferably 20 parts by mass or less, more preferably 0.1 to 10 parts by mass with respect to 100 parts by mass of the negative electrode active material.

Examples of the binder include carboxymethyl cellulose, PVDF, PTFE, polyacrylic acid, and fluororubber. Diene-based rubbers, for example, styrene-butadiene rubber, can also be included. The content ratio of the binder is preferably 10 parts by mass or less, more preferably 0.5 to 6 parts by mass with respect to 100 parts by mass of the negative electrode active material.

The negative electrode active material layer is formed by coating a negative electrode mixture-containing slurry in which a negative electrode mixture, obtained by mixing the negative electrode active material and, as needed, the conductive aid and the binder, is dispersed in a solvent on a negative electrode current collector and drying (removing the solvent) the slurry, and then pressing as needed. The solvent is not particularly limited, and a conventionally known solvent can be used. Examples thereof include N-methyl-2-pyrrolidone, dimethylformamide, dimethylacetamide, and water.

The negative electrode current collector is composed of a metal foil, for example, a copper foil, a nickel foil, or a stainless-steel foil. The negative electrode current collector may be carbon-coated on the surface or processed into a mesh form. The thickness of the negative electrode current collector is preferably 5 to 40 μm, more preferably 6 to 35 μm, and even more preferably 7 to 30 μm.

<4. Separator>

The non-aqueous secondary cell 100 in the present embodiment preferably comprises a separator 170 between the positive electrode 150 and the negative electrode 160 from the viewpoint of preventing short circuit in the positive electrode 150 and the negative electrode 160 and imparting safety such as shutdown. The separator 170 is not limited, and may be the same as one provided in a well-known non-aqueous secondary cell and is preferably an insulating thin membrane having high ion permeability and excellent mechanical strength. Examples of the separator 170 include woven fabric, nonwoven fabric, and a synthetic resin microporous membrane. Among these, a synthetic resin microporous membrane is preferable.

As the synthetic resin microporous membrane, a polyolefin-based microporous membrane, such as a microporous membrane containing polyethylene or polypropylene as a main component or a microporous membrane containing both of these polyolefins, can be suitably used. Examples of the nonwoven fabric include porous membranes made of heat-resistant resins such as glass, ceramic, polyolefin, polyester, polyamide, crystalline polyester, and aramid.

The separator 170 may be composed of a single layer of one type of microporous membrane or a plurality of laminated layers thereof, or may be laminated layers of two or more types of microporous membranes. The separator 170 may be composed of a single layer or a plurality of laminated layers of a mixed resin material obtained by melt-kneading two or more resin materials.

For the purpose of imparting function, inorganic particles may be present on the surface layer or the interior of the separator, and may be further coated or laminated with another organic layer. In PTL 3 previously filed by the present inventors, acetonitrile was applied as a non-aqueous solvent to increase the ionic conductivity of a non-aqueous electrolyte solution. Although it is prevailing practice to use a coated separator that is excellent in safety for in-vehicle cell packs in the engine compartment, the extremely important basic physical properties of impregnation into a coated separator have not been considered at all. The non-aqueous solvents used in the Examples were all polar solvents. There is no mention of measures to achieve both solubilization of the redox shuttle, which tends to be poorly soluble due to intermolecular interactions of π-conjugate planes, and impregnability of the coated separator. This was an issue from the viewpoint of practical performance.

For the purpose of imparting function, the separator may include a crosslinked structure. In order to enhance the safety performance of the non-aqueous secondary cell, these techniques may be combined as needed.

By using such a separator 170, satisfactory input/output characteristics and low self-discharging characteristic required especially for the above lithium-ion cell for high-output applications can be realized. The membrane thickness of the microporous membrane is not particularly limited but is preferably 1 μm or greater from the viewpoint of membrane strength, and is preferably 500 μm or less from the viewpoint of permeability. From the viewpoint of use in high-output applications that required higher self-discharging characteristic than before, such as safety tests, and from the viewpoint of windability with large cell winding machines, the membrane thickness is preferably 5 μm to 30 μm, more preferably 10 μm to 25 μm. When both short-circuit resistance and output performance are emphasized, 15 μm to 25 μm is even more preferable. When both high energy densification and output performance are emphasized, 10 μm to less than 15 μm is even more preferable.

From the viewpoint of following the rapid movement of lithium ions during high output, the porosity is preferably 30% to 90%, more preferably 35% to 80%, and even more preferably 40% to 70%. When the improvement of output performance as a priority while ensuring safety is considered, 50% to 70% is particularly preferable. When both short-circuit resistance and output performance are emphasized, 40% to less than 50% is particularly preferable. From the viewpoint of balancing with membrane thickness and porosity, the air permeability is preferably 1 s/100 cm$^3$ to 400 s/100 cm$^3$, more preferably 100 s/100 cm$^3$ to 350 s/100 cm$^3$. When both short-circuit resistance and output performance are emphasized, 150 s/100 cm$^3$ to 350 s/100 cm$^3$ is particularly preferable. When the improvement of output performance as a priority while ensuring safety is considered, 100 s/100 cm$^3$ to less than 150 s/100 cm$^3$ is particularly preferable. However, when a non-aqueous electrolyte solution having low conductivity and the separator having the above ranges are combined, the high ionic conductivity of the non-aqueous electrolyte solution, rather than the structure of the separator, becomes the rate-determining factor for the moving speed of the lithium ions, thus there is a tendency of failing to obtain the expected input/output characteristics. Therefore, the ionic conductivity of the non-aqueous electrolyte solution is preferably 10 mS/cm, more preferably 15 mS/cm, and even more preferably 20 mS/cm.

When the ionic conductivity is 10 mS/cm or greater, lithium ions are sufficiently conducted within the electrode active material layer, thus it is possible to charge/discharge with a large current. The upper limit of ionic conductivity is not particularly limited, but from the viewpoint of suppressing unexpected cell deterioration such as elution deterioration or peeling deterioration of various cell members, the ionic conductivity is preferably 50 mS/cm or less, preferably 49 mS/cm or less, and even more preferably 48 mS/cm or less. The ionic conductivity of the electrolyte solution can be controlled by, for example, adjusting the viscosity and/or the polarity of the non-aqueous solvent. More specifically, the ionic conductivity of the electrolyte solution can be highly controlled by mixing a non-aqueous solvent with low viscosity and a non-aqueous solvent with high polarity. Further, by using a non-aqueous solvent having low viscosity and high polarity, it is also possible for the ionic conductivity of the electrolyte solution to be highly controlled. By having high ionic conductivity, high output performance can be exhibited even when the electrode active material layer is designed to have high volumetric energy density. The membrane thickness, the air permeability, and the porosity of the separator, as well as the ionic conductivity of the non-aqueous electrolyte solution are not limited to the above examples.

<5. Cell Outer Packaging>

The configuration of the cell outer packaging 110 of the non-aqueous secondary cell 100 in the present embodiment is not particularly limited, and either a cell or a laminate film outer packaging body can be used. As the cell can, for example, a metal can such as a square type, a square tube type, a cylindrical type, an oval type, an elliptical type, a coin type, or a button type made of steel, stainless steel, aluminum, or clad material can be used. As the laminate film outer packaging body, a laminate film consisting of a three-layer configuration of a hot-melt resin/metal film/resin can be used.

The laminate film outer packaging body can be used as the outer packaging body, with two sheets stacked so that the hot-melt resin side faces inward or folded so that the hot-melt resin side faces inward, and the ends sealed by heat sealing. When a laminate film outer packaging body is used, a positive electrode lead structure 130 (or a lead tab connecting a positive electrode terminal to a positive electrode terminal) may be connected to a positive electrode current collector, and a negative electrode lead structure 140 (or a lead tab connecting a negative electrode terminal to a negative electrode terminal) may be connected to a negative electrode current collector. In this case, the laminate film outer packaging body may be sealed with the ends of the positive electrode lead structure 130 and the negative electrode lead structure 140 (or lead tabs connecting to the respective positive electrode terminal and negative electrode terminal) pulled to the exterior of the outer packaging body.

<Method for Manufacturing Cell Pack>

Another embodiment of the present invention is a method for manufacturing a cell pack which comprises non-aqueous secondary cells comprising a non-aqueous electrolyte solution containing an electrolyte salt and a non-aqueous solvent, a positive electrode, and a negative electrode, comprising the following steps:

forming a laminated body comprising the positive electrode and the negative electrode;

producing the non-aqueous secondary cell in which the laminated body and the non-aqueous electrolyte solution are contained and sealed in a cell outer packaging; and configuring the cell pack such that the cell pack is configured with a module in which two or more of the non-aqueous secondary cells are connected in series or with two or more of the modules connected in parallel, or the cell pack is configured with a module in which two or more of the non-aqueous secondary cells are connected in parallel or with two or more of the modules connected in series, wherein each of the non-aqueous secondary cells constituting the module has a ratio of maximum capacity (B) to minimum capacity (A) of 1.00<B/A<2.00, and the non-aqueous electrolyte solution contains a redox shuttle having a reversible redox potential at a greater electropositive potential than a positive electrode potential at full charge.

The manufacturing method preferably further comprises initially charging the non-aqueous secondary cells at 0.001 to 0.3 C.

<6. Method for Producing Cell>

The non-aqueous secondary cell 100 in the present embodiment is produced by the above manufacturing method and well-known methods, using the non-aqueous electrolyte solution described above, a positive electrode 150 having a positive electrode active material layer on one side or both sides of a current collector, a negative electrode 160 having a negative electrode active material layer on one side or both sides of a current collector, and a cell outer packaging 110, as well as a separator 170 as needed.

First, a laminated body consisting of a positive electrode 150 and a negative electrode 160, and a separator 170 as needed, is formed (step of forming a laminated body). For example, a mode in which a long positive electrode 150 and a long negative electrode 160 are wound with a long separator interposed between the positive electrode 150 and the negative electrode 160 in a laminated state to form a laminated body having a wound structure; a mode in which positive electrode sheets and negative electrode sheets obtained by cutting the positive electrode 150 and the negative electrode 160 into a plurality of sheets having a fixed area and shape are alternately laminated via a separator sheet to form a laminated body having a laminate structure; or a mode in which a long separator is folded in a zig-zag manner and positive electrode sheets and negative electrode sheets are alternately inserted between the separator folded in a zig-zag manner to form a laminated body having a laminate structure is possible.

Next, in the step of producing the non-aqueous secondary cell, the non-aqueous secondary cell in the present embodiment can be produced by housing the laminated body described above within a cell outer packaging 110 (cell casing), injecting the non-aqueous electrolyte solution according to the present embodiment into the cell casing, immersing the laminated body in the non-aqueous electrolyte solution, and sealing the cell casing.

Alternatively, the non-aqueous secondary cell 100 can be produced by producing in advance an electrolyte membrane in gel form by impregnating a substrate composed of a polymer material with the non-aqueous electrolyte solution, forming a laminated body having a laminate structure using the positive electrode 150, the negative electrode 160, and the electrolyte membrane in sheet form, and the separator 170 as needed, and thereafter housing the laminated body within the cell outer packaging 110.

When the arrangement of the electrodes is designed such that a portion where the outer edges of the negative electrode active material layer and the positive electrode active material layer overlap is present, or a portion where the width in the non-opposing portion of the negative electrode active material layer is too small is present, there is a risk that the charge/discharge cycling characteristic in the non-aqueous secondary cell degrades due to misalignment of the electrodes during cell assembly. Thus, for an electrode body used in the non-aqueous secondary cell, the position of the electrode is preferably fixed in advance with a tape, such as a polyimide tape, a polyphenylene sulfide tape, or a PP tape, or an adhesive.

In the present embodiment, when a non-aqueous electrolyte solution using acetonitrile is used, due to high ionic conductivity thereof, it is possible for lithium ions released from the positive electrode during initial charging of the non-aqueous secondary cell to diffuse to the entire negative electrode. In non-aqueous secondary cells, it is common for the area of a negative electrode active material layer to be larger than that of a positive electrode active material layer. However, when lithium ions diffuse to and are occluded in a portion of the negative electrode active material layer not facing the positive electrode active material layer, the lithium ions remain in the negative electrode without being released during initial charging. Consequently, the unreleased lithium ions contribute to an irreversible capacity. For this reason, a non-aqueous secondary cell using a non-aqueous electrolyte solution containing acetonitrile may have low initial charge/discharge efficiency.

However, when the area of the positive electrode active material layer is larger than that of the negative electrode active material layer or both are the same, current is likely to be concentrated at the edge portion of the negative electrode active material layer during charging, and lithium dendrite is easily generated.

The ratio of the area of the entire negative electrode active material layer with respect to the area of the portion where the positive electrode active material layer and the negative electrode active material layer face each other is not particularly limited but, due to the above reason, is preferably greater than 1.0 to less than 1.1, more preferably greater than 1.002 to less than 1.09, even more preferably greater than 1.005 to less than 1.08, and particularly preferably greater than 1.01 to less than 1.08. In the non-aqueous secondary cell using the non-aqueous electrolyte solution containing acetonitrile, by reducing the ratio of the area of the entire negative electrode active material layer with respect to the area of the portion where the positive electrode active material layer and the negative electrode active material layer face each other, the initial charge/discharge efficiency can be improved.

Reducing the ratio of the area of the entire negative electrode active material layer with respect to the area of the portion where the positive electrode active material layer and the negative electrode active material layer face each other means limiting the proportion of the area of the portion of the negative electrode active material layer not facing the positive electrode active material layer, whereby it is possible to reduce the amount of lithium ions occluded in the portion of the negative electrode active material layer not facing the positive electrode active material layer (i.e., the amount of lithium ions that become irreversible capacity without being released from the negative electrode during initial charging) as much as possible, among the lithium ions released from the positive electrode during initial charging. By designing the ratio of the area of the entire negative electrode active material layer with respect to the area of the portion where the positive electrode active material layer and the negative electrode active material layer face each other to the above ranges, the load characteristic of the cell due to the use of acetonitrile can be improved, while the initial charge/discharge efficiency of the cell is increased and the generation of lithium dendrite can be suppressed.

The non-aqueous secondary cell 100 in the present embodiment can function as a cell after initial charging and is stabilized by the decomposition of a portion of the non-aqueous electrolyte solution during initial charging. The method of initial charging is not particularly limited but is preferably carried out at 0.001 to 0.3 C, more preferably 0.002 to 0.25 C, and even more preferably 0.003 to 0.2 C. It is also preferable that the initial charging be carried out via a constant voltage in the middle of charging. The constant current at which the design capacity is discharged for 1 hour is 1 C. By setting a long voltage range in which the lithium salt is involved in the electrochemical reaction, in addition to forming a stable and rigid SEI on the electrode surface with the effect of suppressing an increase in internal resistance, the reaction product is not only firmly fixed on the negative electrode 160 but somehow also imparts satisfactory effect to members other than the negative electrode 160, such as the positive electrode 150 and the separator 170. Therefore, carrying out initial charging in consideration of the electrochemical reaction of the lithium salt dissolved in the non-aqueous electrolyte solution is very effective.

The non-aqueous secondary cell 100 in the present embodiment can be used as a cell pack in which a plurality of the non-aqueous secondary cells 100 are connected in series or parallel. From the viewpoint of managing the charging/discharging state of the cell pack, the working voltage range per cell is preferably 2 to 5 V, more preferably 2.5 to 5 V, and particularly preferably 2.75 to 5 V.

<7. Module and Cell Pack (Configuration Step)>

Figure 3:
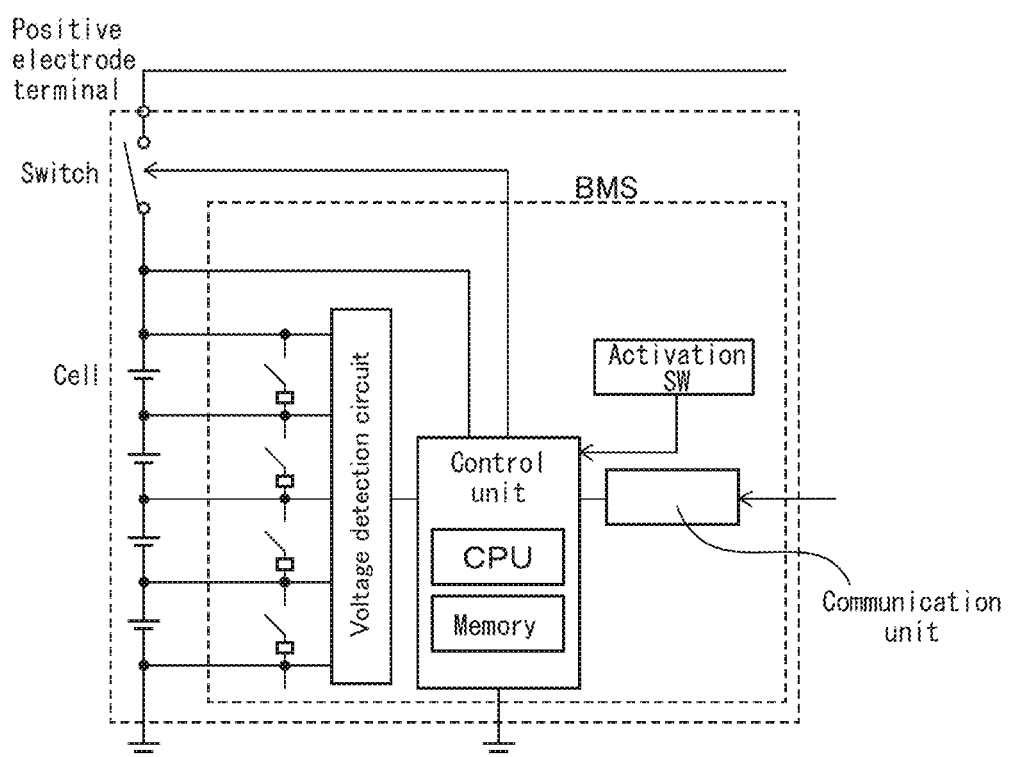
FIG. 3 is a circuit diagram schematically showing one example of the cell pack of the present embodiment.

The non-aqueous secondary cell of the present embodiment is used as a module in which two or more cells are connected in series or parallel. In addition, the module is used as a cell pack comprising one or more modules. Specifically, the cell pack is configured with a module in which two or more of the non-aqueous secondary cells are connected in series or with two or more modules connected in parallel, or is configured with a module in which two or more of the non-aqueous secondary cells are connected in parallel or with two or more modules connected in series. FIG. 3 is a circuit diagram schematically showing one example of the cell pack of the present embodiment. From the viewpoint of managing the charging/discharging state of the cell pack, the working voltage range per cell is preferably 2 to 5 V, more preferably 2 to 4.3 V, and particularly preferably 2 to 3.9 V. From the viewpoint of improving cell yield, the capacity of the non-aqueous secondary cell constituting the module is preferably 1 mAh to 100 Ah.

The ratio of the maximum capacity (B) to the minimum capacity (A) of each non-aqueous secondary cell constituting the module is 1.00<B/A<2.00. The minimum capacity and the maximum capacity in the present embodiment are each defined by the charging current capacity designed in a unit cell. Specifically, the minimum capacity and the maximum capacity are obtained by subtracting the charging current capacity corresponding to the actual SOC (State of Charge) from the current capacity at full charge known by charging/discharging immediately before configuring the module. Alternatively, the minimum capacity and the maximum capacity in the present embodiment can be obtained by taking out each non-aqueous secondary cell from the module and measuring each charging current capacity. The current capacity at full charge refers to the capacity of the non-aqueous secondary cell when the SOC is 100%. In other words, the current capacity at full charge is the capacity of a cell designed with a positive electrode and a negative electrode and is known as "design capacity" in the present embodiment.

The minimum capacity (A) and the maximum capacity (B) of the present embodiment are preferably the capacities when assembling the module.

For the cell pack of the present embodiment, by including acetonitrile and a linear carbonate in the non-aqueous solvent, the redox shuttle having a specific structure is able to function sufficiently. Thus, it is possible for the imbalance between non-aqueous secondary cells when charged at high current density to be eliminated, even when a plurality of non-aqueous secondary cells with different capacities are connected. By including an imide salt and $LiPF_6$ as the electrolyte salt, setting the content of the imide salt to 0.5 mol to 3 mol per L of the non-aqueous solvent, and setting the molar ratio in the non-aqueous electrolyte solution such that $LiPF_6$<the imide salt, it is possible for the imbalance between non-aqueous secondary cells when charged from low temperature to high temperature to be eliminated, and a high-capacity cell pack with stable charge/discharge cycling can be provided. The cell pack of the present embodiment suppresses deterioration due to overcharging, and thus brings about a prominent effect in which it is possible for the imbalance between non-aqueous secondary cells to be eliminated, even when the ratio of the maximum capacity (B) to the minimum capacity (A) of the non-aqueous secondary cell is 1.05<B/A<2.00.

The design capacity of each non-aqueous secondary cell constituting the module can be measured by fully charging at a constant voltage after discharging at a constant current to a rated voltage where SOC=0%. The cell pack of the present embodiment suppresses deterioration due to overcharging, and thus brings about a prominent effect in which it is possible for the imbalance between non-aqueous secondary cells to be eliminated, even when the ratio of the maximum design capacity (D) to the minimum design capacity (C) of the non-aqueous secondary cell is 1.05<D/C<2.00.

<8. Use>

The redox shuttle of the present embodiment can be used as described below. Specifically, a compound represented by general formula (1) below:

[Chem. 10]

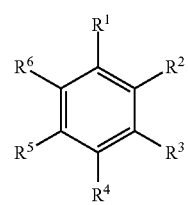

(1)

wherein $R^1$, $R^2$, $R^3$, $R^4$, $R^5$, and $R^6$ represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms, is used as the redox shuttle of a cell pack comprising non-aqueous secondary cells each comprising a non-aqueous electrolyte solution containing an electrolyte salt and a non-aqueous solvent, a positive electrode, and a negative electrode. The cell pack is configured with a module in which two or more of the non-aqueous secondary cells are connected in series or with two or more of the modules connected in parallel, or the cell pack is configured with a module in which two or more of the non-aqueous secondary cells are connected in parallel or with two or more of the modules connected in series. Each of the non-aqueous secondary cells constituting the module has a ratio of maximum capacity (B) to minimum capacity (A) of 1.00<B/A<2.00.

The mode of use is the same as in the contents of <1. Non-aqueous electrolyte solution> to <7. Module and cell pack>.

From the foregoing, embodiments for carrying out the present invention have been described above. However, the present invention is not limited to the above embodiments, and various modifications can be made without departing from the scope thereof.

EXAMPLES

Hereinafter, the present invention will be specifically described with reference to the Examples. However, the present invention is not limited thereto. Further, each characteristic of the non-aqueous secondary cell and cell pack will be measured and evaluated as described below.

Examples 1 to 3 and Comparative Examples 1 to 3

(1) Preparation of Non-Aqueous Electrolyte Solution and Measurement of Solubility Under an inert atmosphere at 25° C., various non-aqueous solvents and various lithium salts were mixed at predetermined concentrations, and various lithium salts and redox shuttles were further added at predetermined concentrations, thereby preparing non-aqueous electrolyte solutions (S1) to (S5). The compositions of the non-aqueous electrolyte solutions and the presence of undissolved redox shuttles are indicated in Table 1 below.

The abbreviations for the non-aqueous solvents, the electrolyte salts, and the redox shuttles in Table 1 below have the following meanings. The percentage by mass of a redox shuttle in Table 1 indicates the percentage by mass with respect to the total amount of a non-aqueous electrolyte solution. Conversion between percentage by volume and percentage by mass is possible using the specific gravity (25° C.) of each of the non-aqueous solvents, electrolyte salts, and redox shuttles.

(Non-Aqueous Solvent)
AcN: acetonitrile
EMC: ethyl methyl carbonate
GBL: γ-butyrolactone
PC: propylene carbonate
EC: ethylene carbonate
VC: vinylene carbonate
ES: ethylene sulfite
(Electrolyte Salt)
$LiPF_6$: lithium hexafluoride
LiFSI: lithium bis(fluorosulfonyl)imide ($LiN(SO_2F)_2$)
(Redox Shuttle)
DDB: 1,4-di-tert-butyl-2,5-bismethoxybenzene
DDFB: 1,4-di-tert-butyl-2,5-bis(2,2,2-trifluoroethoxy)benzene (2) Measurement of Ionic Conductivity of Non-Aqueous Electrolyte Solution The non-aqueous electrolyte solution was prepared in a container made of polypropylene. A "CT-57101B" (trade name) ionic conductivity measurement cell manufactured by DKK-TOA Corporation connected to a "CM-30R" (trade name) ionic conductivity meter was inserted into the container containing the non-aqueous electrolyte solution, and the ionic conductivity of the non-aqueous electrolyte solution at 25° C. was measured. The results are shown in Table 1 below.

(3) Measurement of Impregnability of Separator by Non-Aqueous Electrolyte Solution 200 μL of the obtained non-aqueous electrolyte solution as described above was weighed in a pipettor and dropped onto an inorganic oxide particle-coated polyolefin separator [Hypore™] (trade name) manufactured by Asahi Kasei Corporation. Impregnation completion within 1 second was indicated as "Y", and impregnation completion not within 1 second due to surface tension was indicated as "N". The results are shown in Table 1 below.

TABLE 1

| | Non-aqueous electrolyte solution | Non-aqueous solvent (% by volume) | | | | | | | Electrolyte salt (mol/L solvent) | | Redox shuttle (% by mass) | | Undissolved | Ionic conductivity (mS/cm) | Separator impregnating ability |
|---|---|---|---|---|---|---|---|---|---|---|---|---|---|---|---|
| | | AcN | EMC | GBL | PC | EC | VC | ES | $LiPF_6$ | LiFSI | DDB | DDFB | | | |
| Example 1 | S1 | 34.5 | 43.5 | — | — | 18 | 4 | — | 0.05 | 1.25 | 2 | — | N | 18.2 | Y |
| Comparative Example 1 | S2 | 34.5 | 43.5 | — | — | 18 | 4 | — | 0.05 | 1.25 | — | — | — | 18.2 | Y |
| Comparative Example 2 | S3 | 34.5 | — | 43.5 | — | 18 | 4 | — | 0.05 | 1.25 | 2 | — | Y | 17.3 | N |
| Comparative Example 3 | S4 | 34.5 | — | — | 43.5 | 18 | 4 | — | 0.05 | 1.25 | 2 | — | Y | 20.1 | N |
| Example 2 | S5 | 45 | 39 | — | — | 10 | 2 | 4 | 0.3 | 1 | 1.8 | — | N | 24.9 | Y |
| Example 3 | S6 | 35 | 44 | — | — | 15 | 2 | 4 | 0.3 | 1 | — | 1.8 | N | 21.5 | Y |

Example 4

(4) Evaluation of Series Connection at 25° C. (SOC-Adjusted Non-Aqueous Secondary Cell)

(4-1) Production of Lead Tab-Attached Positive Electrode (LP1)

LiFePO$_4$ as the positive electrode active material, acetylene black powder as the conductive aid, and polyvinylidene fluoride (PVdF) as the binder were mixed in a mass ratio of 85:8:7 to obtain a positive electrode mixture. Into the obtained positive electrode mixture, N-methyl-2-pyrrolidone as the solvent was charged and further mixed to prepare a positive electrode mixture-containing slurry. While adjusting the basis weight of the positive electrode mixture-containing slurry on one side of an aluminum foil with a thickness of 15 μm and a width of 280 mm acting as the positive electrode current collector, a coating pattern so as to have a coated width of 240 to 250 mm, a coated length of 125 mm, and an uncoated length of 20 mm was applied thereon using a three-roll transfer coater, and the solvent was removed by drying in a hot-air drying oven. The obtained electrode roll was trimmed on both sides, and decompression drying was carried out at 130° C. for 8 hours, followed by rolling with a roll press, so that the resulting positive electrode active material layer had a density of 1.84 g/cm$^3$, to obtain a positive electrode (P1) composed of the positive electrode active material layer and the positive electrode current collector. The basis weight of the positive electrode active material layer was 13.6 mg/cm$^2$.

Next, the positive electrode (P1) was cut so that the positive electrode mixture layer had an area of 30 mm×50 mm and included an exposed portion of the aluminum foil. A lead tab piece made of aluminum for extracting current was welded to the exposed portion of the aluminum foil and vacuum-dried at 170° C. for 10 hours, thereby obtaining a lead tab-attached positive electrode (LP1).

(4-2) Production of Lead Tab-Attached Negative Electrode (LN1)

Artificial graphite powder MCMB as the negative electrode active material, acetylene black powder as the conductive aid, and polyvinylidene fluoride (PVdF) as the binder were mixed in a solid content mass ratio of 93:2:5 to obtain a negative electrode mixture. Into the obtained negative electrode mixture, N-methyl-2-pyrrolidone as a solvent was charged and further mixed to prepare a negative electrode mixture-containing slurry. While adjusting the basis weight of the negative electrode mixture-containing slurry on one side of a copper foil with a thickness of 8 μm and a width of 280 mm acting as the negative electrode current collector, a coating pattern so as to have a coated width of 240 to 250 mm, a coated length of 125 mm, and an uncoated length of 20 mm was applied thereon using a three-roll transfer coater, and the solvent was removed by drying in a hot-air drying oven. The obtained electrode roll was trimmed on both sides, and decompression drying was carried out at 80° C. at 12 hours, followed by rolling with a roll press, so that the resulting negative electrode active material layer had a density of 1.28 g/cm$^3$, to obtain a negative electrode (N1) composed of the negative electrode active material layer and the negative electrode current collector. The basis weight of the negative electrode active material layer was 6.1 mg/cm$^2$.

Next, the negative electrode (N1) was cut so that the negative electrode mixture layer had an area of 32 mm×52 mm and included an exposed portion of the copper foil. A lead tab piece made of nickel for extracting current was welded to the exposed portion of the copper foil and vacuum-dried at 170° C. for 10 hours, thereby obtaining a lead tab-attached negative electrode (LN1).

(4-3) Production of Single-Layer Laminate Type Non-Aqueous Secondary Cell

The lead tab-attached positive electrode (LP1) and the lead tab-attached negative electrode (LN1) were superimposed via an inorganic oxide particle-coated polyolefin separator [Hypore™] (trade name) (thickness of 21 μm, air permeability of 80 s/100 cm$^3$) so that the mixture-coated surface of each electrode faced the other to form a laminated electrode body. The laminated electrode body was housed in a 100 mm×90 mm aluminum laminate sheet outer packaging body and vacuum-dried at 80° C. for 5 hours to remove moisture. Subsequently, the non-aqueous electrolyte solution (S1) described above was then injected into the outer packaging body, and thereafter the outer packaging body was sealed, thereby producing a single-layer laminate type non-aqueous secondary cell.

(4-4) SOC adjustment of single-layer laminate type non-aqueous secondary cell

The obtained single-layer laminate type non-aqueous secondary cell as described above underwent initial charging according to the procedure in (4-4-1) described below. Next, SOC of the single-layer laminate type non-aqueous secondary cell was adjusted according to the procedure in (4-4-2) described below.

(4-4-1) Initial Charge/Discharge Process of Single-Layer Laminate Type Non-Aqueous Secondary Cell The single-layer laminate type non-aqueous secondary cell was set to an ambient temperature of 25° C. and charged for 2 hours at a constant current of 0.025 C. After pausing for 3 hours, the cell was charged at a constant current of 0.05 C to reach 3.7 V, and then charged at a constant voltage of 3.7 V until the current attenuated to 0.02 C. Thereafter, the cell was discharged at a constant current of 0.05 C until 2.0 V. Two single-layer laminate type non-aqueous secondary cells in total were prepared by the same procedure.

(4-4-2) SOC Adjustment of Single-Layer Laminate Type Non-Aqueous Secondary Cell

The single-layer laminate type non-aqueous secondary cells obtained in (4-4-1) above were set to an ambient temperature of 25° C. and charged at a constant current corresponding to 0.2 C to adjust the respective SOC to 65% and 35%.

(4-5) Production of Series Module and Evaluation of Charging/Discharging

The single-layer laminate type non-aqueous secondary cell with SOC=65% and the single-layer laminate type non-aqueous secondary cell with SOC=35% obtained in (4-4-2) above were connected in series to produce a module. The ratio of the maximum capacity (14.6 mAh) to the minimum capacity (7.9 mAh) of the non-aqueous secondary cells constituting the module was 1.85. The obtained series module was set to an ambient temperature of 25° C. and charged at a constant current of 0.2 C to reach 7.4 V, and then at a constant voltage of 7.4 V until the total charging time reached 5.5 hours or the current attenuated to 0.05 C. Thereafter, the module was discharged at a constant current corresponding to 0.2 C until 4.0 V. Next, the module was charged at a constant current of 0.2 C to reach 7.4 V, and then at a constant voltage of 7.4 V until the total charging time reached 8 hours or the current attenuated to 0.05 C. Thereafter, the module was discharged at a constant current corresponding to 0.2 C until 4.0 V. The results are shown in Tables 2 and 3 below.

The voltage increased first in the non-aqueous secondary cell initially adjusted to SOC=65%. However, due to the effect of high ionic conductivity, the redox shuttle functioned sufficiently to level the voltage near 3.8 V as a unit cell, and further voltage increase was suppressed. The non-aqueous secondary cell initially adjusted to SOC=35% reached a nearly fully charged state while the other non-aqueous secondary cell plateaued near 3.8 V. In the second cycle, both of the non-aqueous secondary cells exhibited nearly the same charge/discharge behavior. This proved that the state of the unit cells which were in different SOC states was corrected.

Comparative Example 4

Except that (S2) was used instead of the non-aqueous electrolyte solution (S1) of Example 4, a series cell was prepared and evaluated by the same procedures as in Example 4. The ratio of the maximum capacity (14.7 mAh) to the minimum capacity (7.9 mAh) of the non-aqueous secondary cells constituting the module was 1.86. The results are shown in Tables 2 and 3 below.

Because the voltage of the non-aqueous secondary cell initially adjusted to SOC=65% increased first and the charging voltage exceeded 4 V, the charge/discharge program shifted to a constant voltage condition upon reaching 7.4 V as a series unit cell. Consequently, the cell initially adjusted to SOC=35% remained charged near 3.4 V. When discharging, the cell initially adjusted to SOC=35% was in an overdischarged state significantly below 2.0 V.

Example 5

(5) Evaluation of Series Connection at −10° C. (SOC-Adjusted Non-Aqueous Secondary Cell)
(5-1) Production of Single-Layer Laminate Type Non-Aqueous Secondary Cell The above lead tab-attached positive electrode (LP1) and lead tab-attached negative electrode (LN1) were superimposed via an inorganic oxide particle-coated polyolefin separator [Hypore™] (trade name) (thickness of 21 μm, air permeability of 80 s/100 cm³) so that the mixture-coated surface of each electrode faced the other to form a laminated electrode body. The laminated electrode body was housed in a 100 mm×90 mm aluminum laminate sheet outer packaging body and vacuum-dried at 80° C. for 5 hours to remove moisture. Subsequently, the non-aqueous electrolyte solution (S5) described above was then injected into the outer packaging body, and thereafter the outer packaging body was sealed, thereby producing a single-layer laminate type non-aqueous secondary cell.
(5-2) Production of Series Module and Evaluation of Charging/Discharging Except that the single-layer laminate type non-aqueous secondary cell obtained in (5-1) above was used, the initial charging process was carried out according to the procedure in (4-4-1) above. Next, SOC of the single-layer laminate type non-aqueous secondary cell was adjusted according to the procedure in (4-4-2). The obtained single-layer laminate type non-aqueous secondary cell with SOC=65% and single-layer laminate type non-aqueous secondary cell with SOC=35% were connected in series to produce a module. The ratio of the maximum capacity (15.4 mAh) to the minimum capacity (8.3 mAh) of the non-aqueous secondary cells constituting the module was 1.86. The obtained series module was set to an ambient temperature of −10° C. and charged at a constant current of 0.1 C to reach 7.4 V, and then at a constant voltage of 7.4 V until the total charging time reached 11 hours or the current attenuated to 0.05 C. Thereafter, the module was discharged at a constant current corresponding to 0.1 C until 4.0 V. Next, the module was charged at a constant current of 0.1 C to reach 7.4 V, and then at a constant voltage of 7.4 V until the total charging time reached 16 hours or the current attenuated to 0.05 C. Thereafter, the module was discharged at a constant current corresponding to 0.1 C until 4.0 V. The results are shown in Tables 2 and 3 below.

The voltage increased first in the non-aqueous secondary cell initially adjusted to SOC=65%. However, even at low temperature, the redox shuttle functioned sufficiently to level the voltage near 3.8 V as a unit cell, and further voltage increase was suppressed. The non-aqueous secondary cell initially adjusted to SOC=35% reached a nearly fully charged state while the other non-aqueous secondary cell plateaued near 3.8 V. In the second cycle, both of the cells exhibited nearly the same charge/discharge behavior. This proved that the state of the unit cells which were in different SOC states was corrected.

Comparative Example 5

$LiPF_6$ was dissolved at 1 mol per L of a solvent of ethylene carbonate, ethyl methyl carbonate, and vinylene carbonate mixed in a volume ratio of 29:69:2, and a non-aqueous electrolyte solution (S0) was obtained.

Except that (S0) was used instead of the non-aqueous electrolyte solution (S5) of Example 5, a series cell was produced and evaluated by the same procedures as in Example 5. The ratio of the maximum capacity (15.3 mAh) to the minimum capacity (8.2 mAh) of the non-aqueous secondary cells constituting the module was 1.87. The results are shown in Tables 2 and 3 below.

Because the voltage of the non-aqueous secondary cell initially adjusted to SOC=65% increased first and the charging voltage exceeded 4 V, the charge/discharge program shifted to a constant voltage condition upon reaching 7.4 V as a series unit cell. Consequently, the non-aqueous secondary cell initially adjusted to SOC=35% remained charged near 3.4 V. When discharging, the non-aqueous secondary cell initially adjusted to SOC=35% was in an overdischarged state significantly below 2.0 V.

Figure 4:
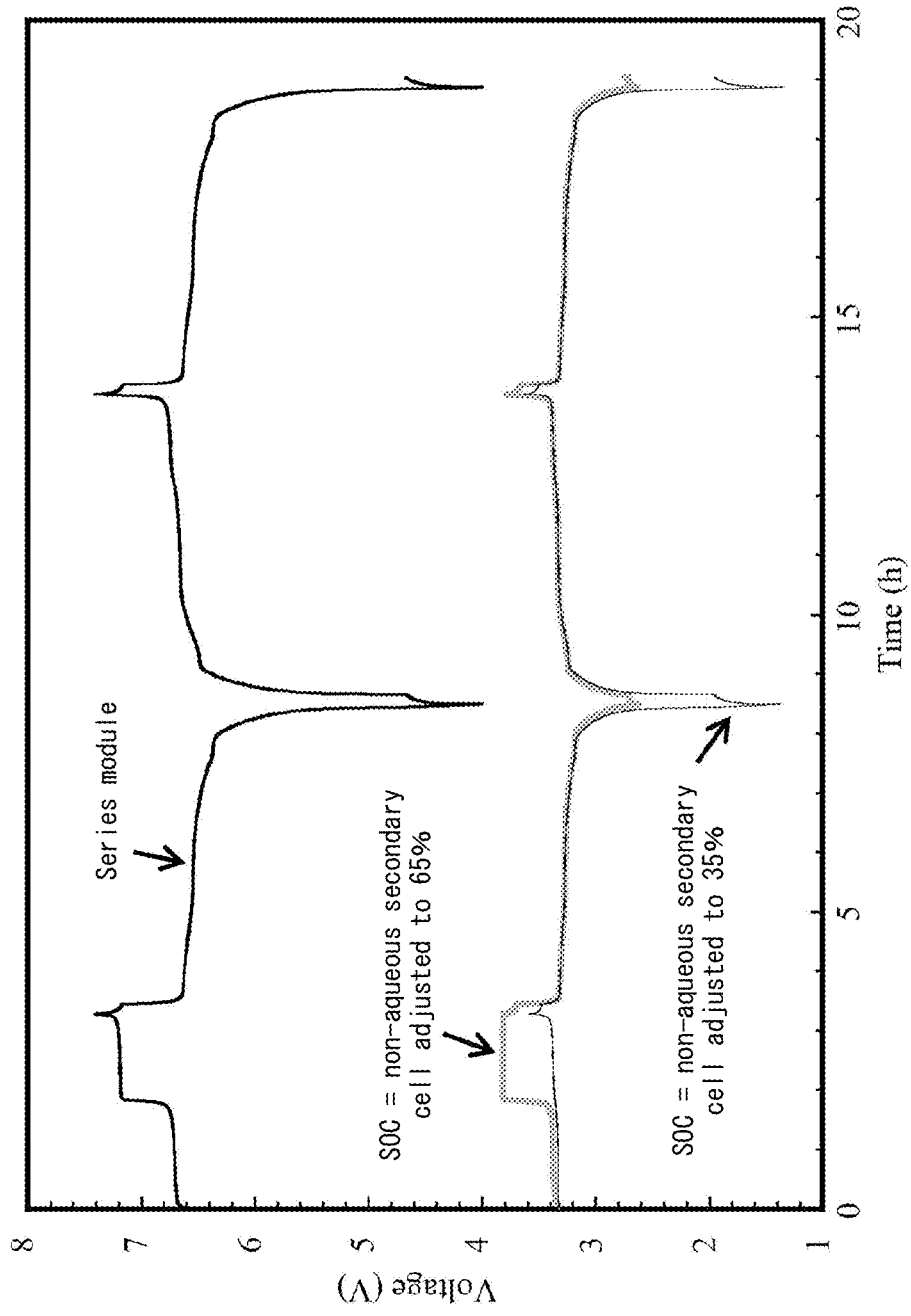
FIG. 4 is a graph showing the results of the evaluation of charging/discharging of Example 4.
Figure 5:
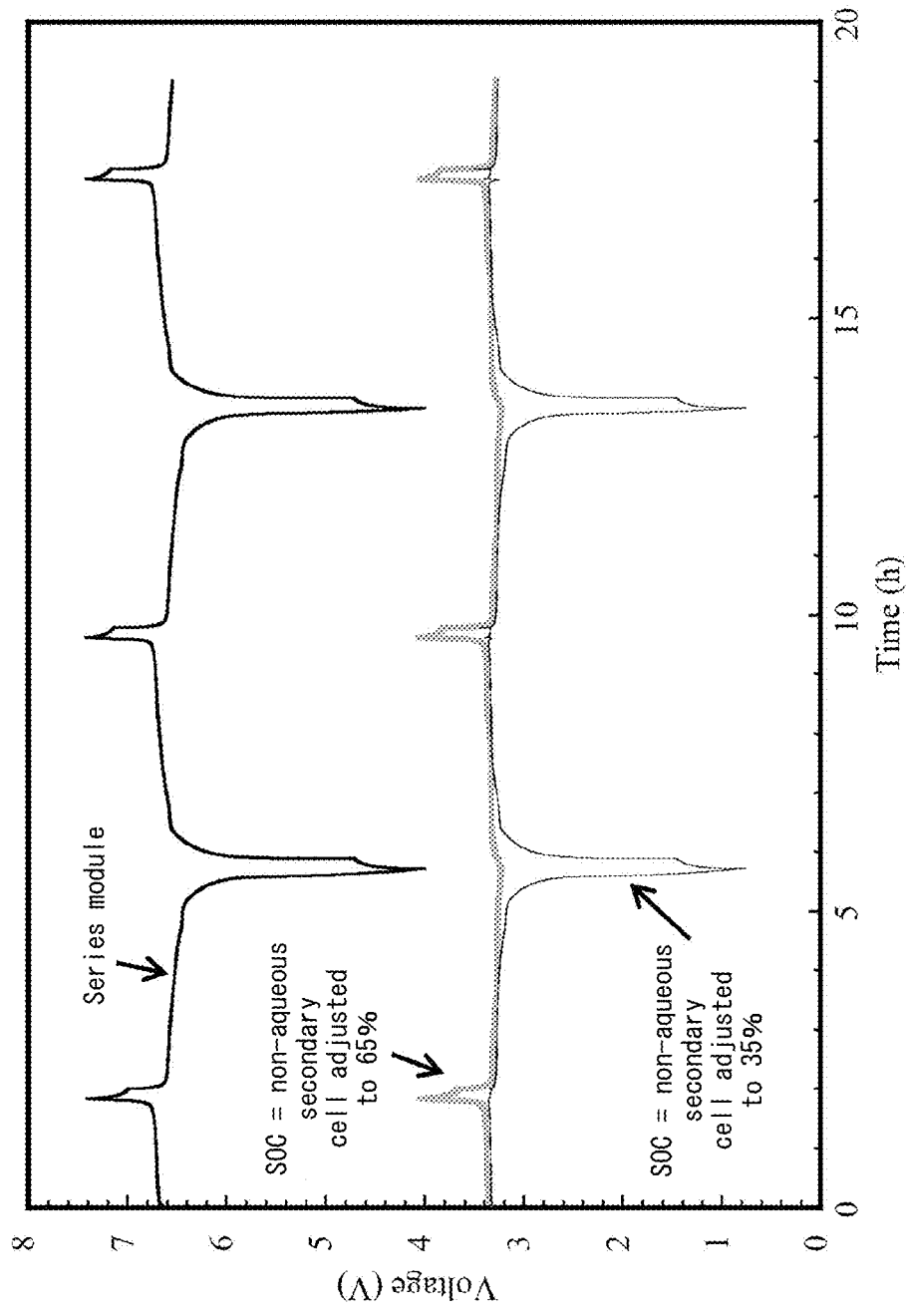
FIG. 5 is a graph showing the results of the evaluation of charging/discharging of Comparative Example 4.
Figure 6:
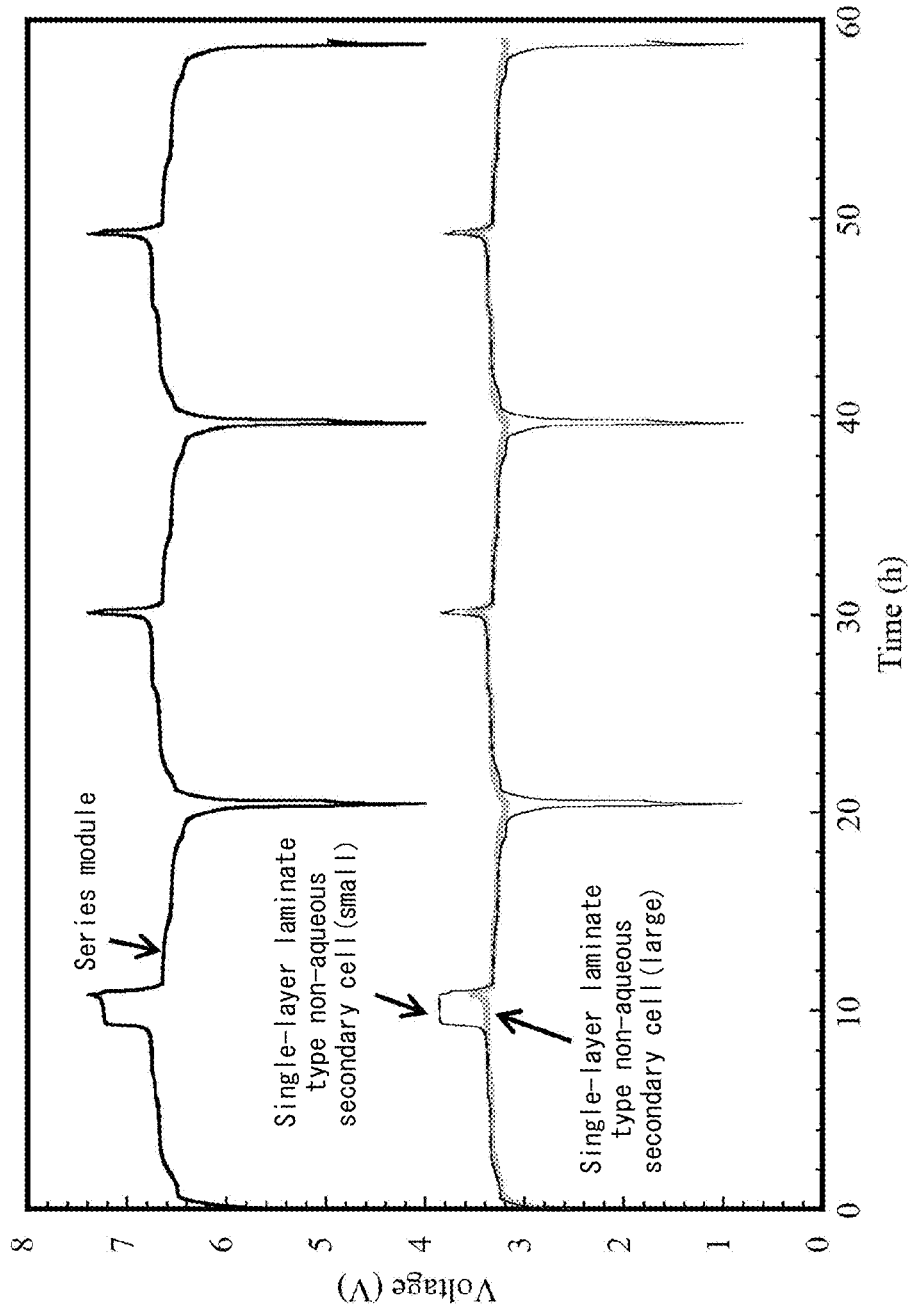
FIG. 6 is a graph showing the results of the evaluation of charging/discharging of Example 6.
Figure 7:
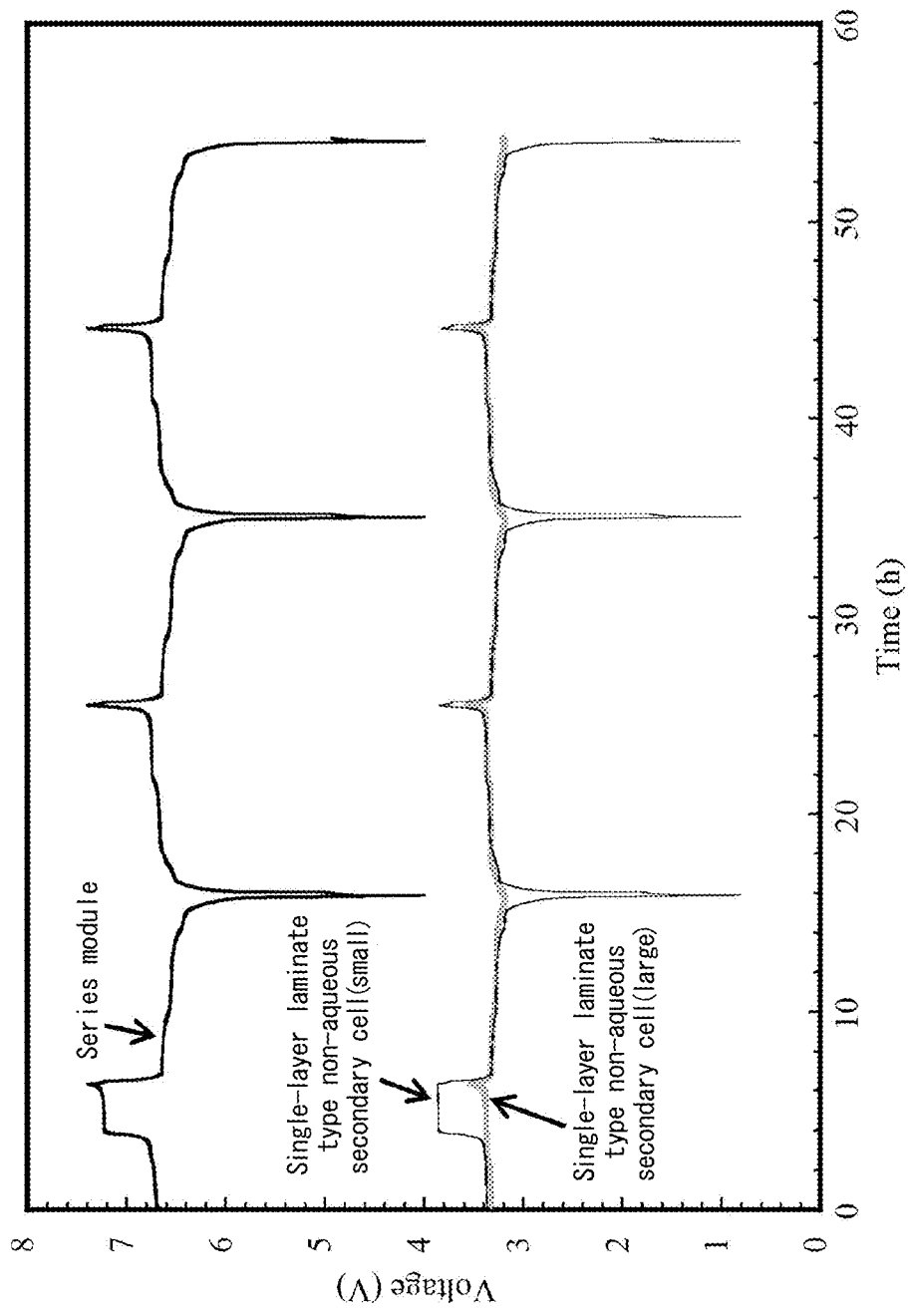
FIG. 7 is a graph showing the results of the evaluation of charging/discharging of Example 7.
Figure 8:
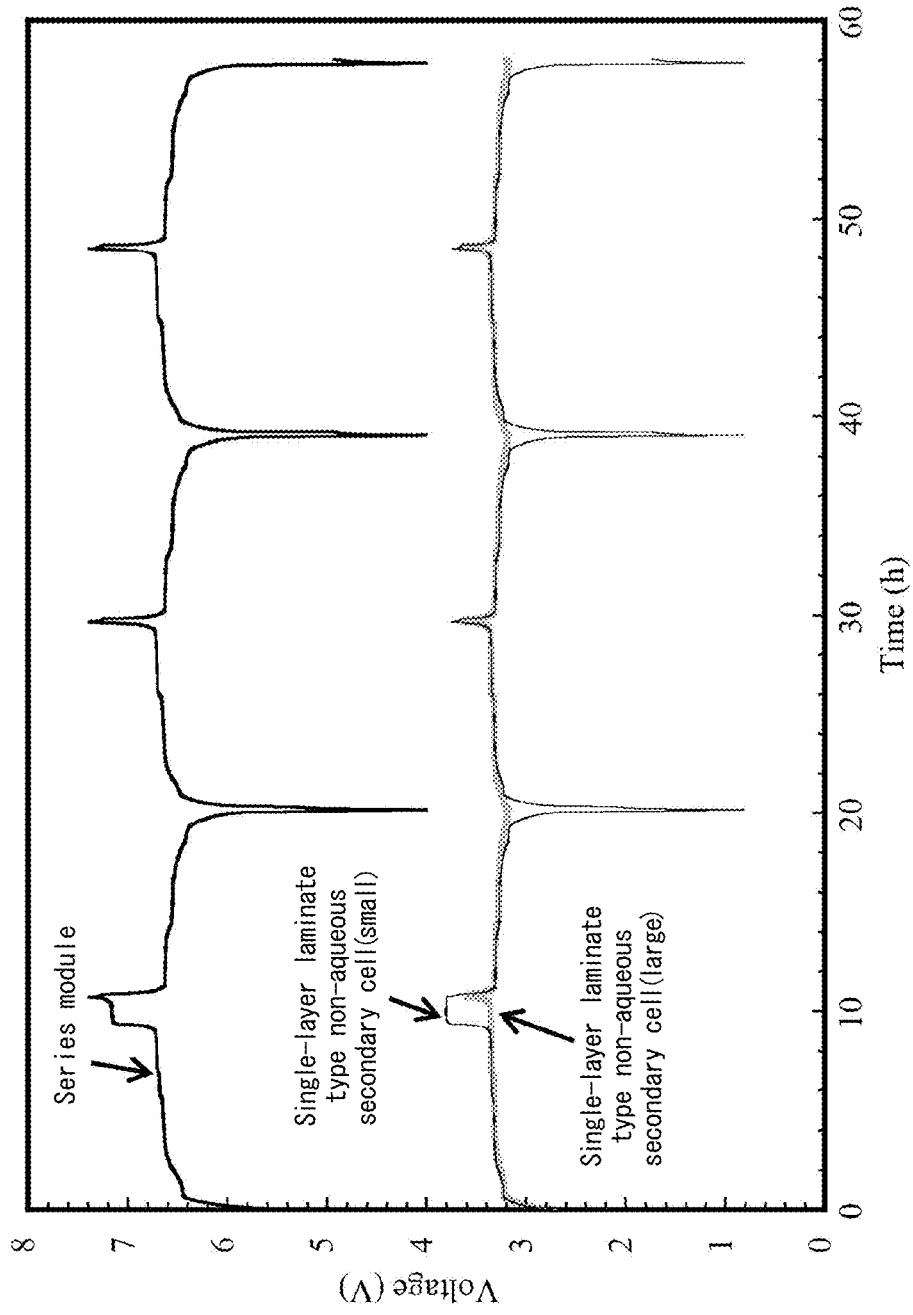
FIG. 8 is a graph showing the results of the evaluation of charging/discharging of Example 8.
Figure 9:
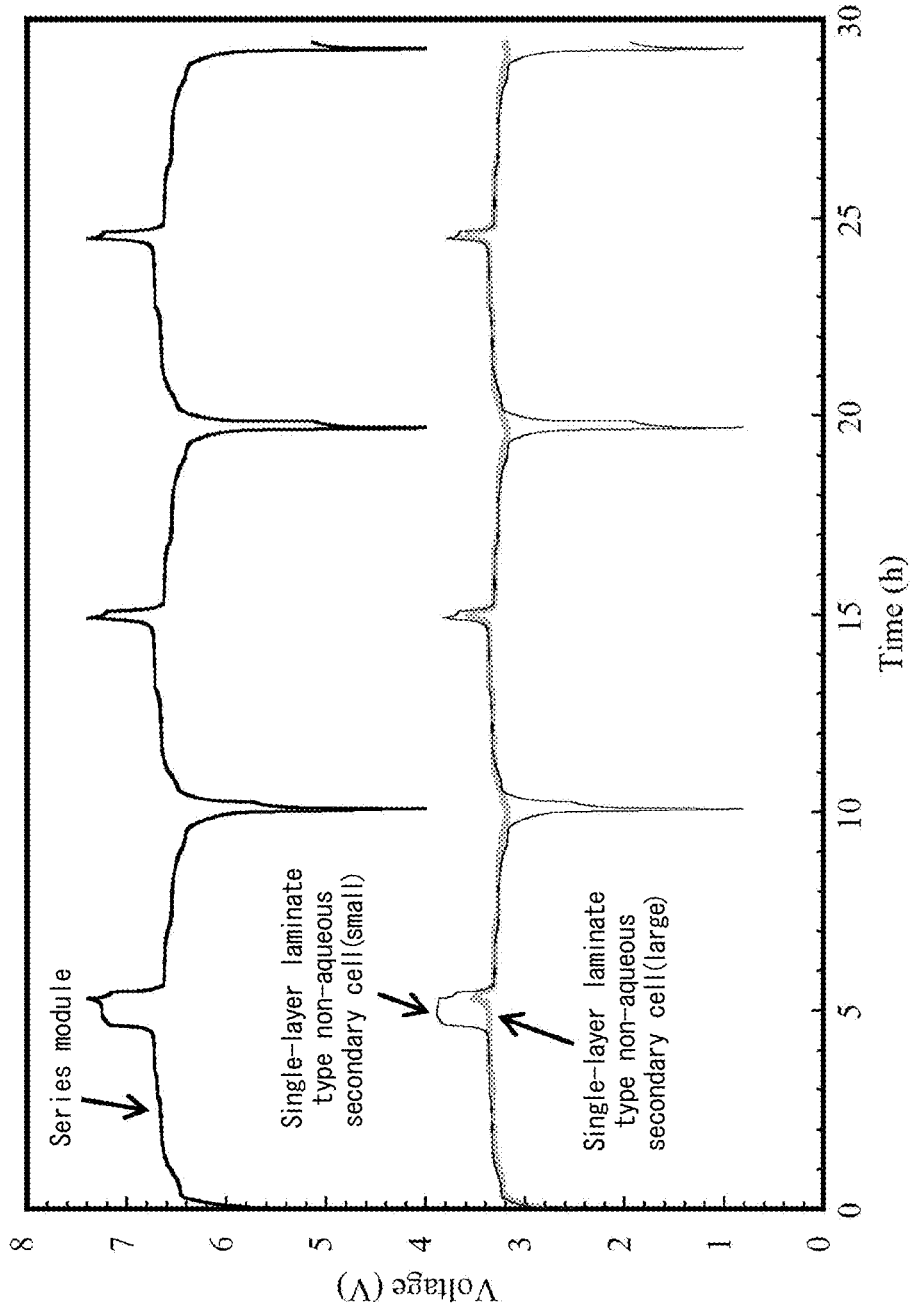
FIG. 9 is a graph showing the results of the evaluation of charging/discharging of Example 9.

The results of Examples 4 and 5 and Comparative Examples 4 and 5 are shown in Tables 2 and 3. The results of Example 4 and Comparative Example 4 are shown in FIGS. 4 and 5, respectively.

TABLE 2

SOC = cell adjusted to 65%

| | Non-aqueous electrolyte solution | Initial charge capacity (mAh) | Initial discharge capacity (mAh) | Initial charge/ discharge efficiency (%) | Second charge capacity (mAh) | Second discharge capacity (mAh) | Second charge/ discharge efficiency (%) |
|---|---|---|---|---|---|---|---|
| Example 4 | S1 | 14.9 | 23.0 | 153.9 | 23.0 | 22.9 | 99.3 |
| Comparative Example 4 | S2 | 8.1 | 16.7 | 206.8 | 16.8 | 16.6 | 98.9 |
| Example 5 | S5 | 14.6 | 22.7 | 155.5 | 22.7 | 22.5 | 99.1 |
| Comparative Example 5 | S0 | 8.0 | 16.5 | 206.3 | 16.5 | 16.3 | 98.2 |

TABLE 3

SOC = cell adjusted to 35%

| | Non-aqueous electrolyte solution | Initial charge capacity (mAh) | Initial discharge capacity (mAh) | Initial charge/ discharge efficiency (%) | Second charge capacity (mAh) | Second discharge capacity (mAh) | Second charge/ discharge efficiency (%) |
|---|---|---|---|---|---|---|---|
| Example 4 | S1 | 14.9 | 23.0 | 154.4 | 23.0 | 22.9 | 99.6 |
| Comparative Example 4 | S2 | 8.1 | 16.7 | 206.2 | 16.8 | 16.6 | 98.8 |
| Example 5 | S5 | 14.6 | 22.7 | 155.5 | 22.7 | 22.5 | 99.1 |
| Comparative Example 5 | S0 | 8.0 | 16.5 | 206.3 | 16.5 | 16.3 | 98.8 |

Example 6

(6) Evaluation of Series Connection at 25° C. (Non-Aqueous Secondary Cells with Different Design Capacities)

(6-1) Production of Lead Tab-Attached Positive Electrodes (LP2 and LP3)

LiFePO$_4$ as the positive electrode active material, carbon black powder as the conductive aid, and polyvinylidene fluoride (PVdF) as the binder were mixed in a mass ratio of 84:10:6 to obtain a positive electrode mixture. Into the obtained positive electrode mixture, N-methyl-2-pyrrolidone was charged and further mixed to prepare a positive electrode mixture-containing slurry. While adjusting the basis weight of the positive electrode mixture-containing slurry on one side of an aluminum foil with a thickness of 15 μm and a width of 280 mm acting as a positive electrode current collector, a coating pattern so as to have a coated width of 240 to 250 mm, a coated length of 125 mm, and an uncoated length of 20 mm was applied thereon using a three-roll transfer coater, and the solvent was removed by drying in a hot-air drying oven. The obtained electrode roll was trimmed on both sides, and decompression drying was carried out at 130° C. for 8 hours, followed by rolling with a roll press, so that the resulting positive electrode active material layer had a density of 1.90 g/cm$^3$, to obtain a positive electrode (P2) composed of the positive electrode active material layer and the positive electrode current collector. The basis weight of the positive electrode active material layer is 17.5 mg/cm$^2$.

Next, the positive electrode (P2) was cut so that the positive electrode mixture layer had an area of 30 mm×50 mm and included an exposed portion of the aluminum foil. A lead tab piece made of aluminum for extracting current was welded to the exposed portion of the aluminum foil and vacuum-dried at 170° C. for 10 hours, thereby obtaining a lead tab-attached positive electrode (LP2).

Except that the area of positive electrode mixture layer was set to 33 mm×53 mm, a lead tab-attached positive electrode (LP3) was obtained by the same procedure as above.

(6-2) Production of Lead Tab-Attached Negative Electrodes (LN2 and LN3)

Artificial graphite powder MCMB as the negative electrode active material, acetylene black powder as the conductive aid, and carboxymethyl cellulose (density of 1.60 g/cm$^3$) solution (solid content concentration of 1.83% by mass) and diene rubber (glass transition temperature: −5° C., dry number-average particle size: 120 nm, density of 1.00 g/cm$^3$, dispersion medium: water, and solid content concentration of 40% by mass) as the binder were mixed in a solid content mass ratio of 95.7:0.5:1.7:2.1 to obtain a negative electrode mixture. Into the negative electrode mixture water as the solvent, so as to obtain a solid content of 45% by mass, was charged and further mixed to prepare a negative electrode mixture-containing slurry. While adjusting the basis weight of the negative electrode mixture-containing slurry on one side of a copper foil with a thickness of 8 μm and a width of 280 mm acting as a negative electrode current collector, a coating pattern so as to have a coated width of 240 to 250 mm, a coated length of 125 mm, and an uncoated length of 20 mm was applied thereon using a three-roll transfer coater, and the solvent was removed by drying in a hot-air drying furnace. The obtained electrode roll was trimmed on both sides, and decompression drying was carried out at 80° C. for 12 hours, followed by rolling with a roll press so that the resulting negative electrode active material layer had a density of 1.5 g/cm$^3$, to obtain a negative electrode (N2) composed of the negative electrode active material layer and the negative electrode current collector. The basis weight of the negative electrode active material layer was 7.5 mg/cm$^2$.

Next, the negative electrode (N2) was cut so that the negative electrode mixture layer had an area of 32 mm×52 mm and included an exposed portion of the copper foil. A lead tab piece made of nickel for extracting current was welded to the exposed portion of the copper foil and vacuum-dried at 170° C. for 10 hours, thereby obtaining a lead tab-attached negative electrode (LN2).

Except that the area of the negative electrode mixture layer was set to 35 mm×55 mm, a lead tab-attached negative electrode (LN3) was obtained by the same procedure as above.

(6-3) Production of Single-Layer Laminate Type Non-Aqueous Secondary Cells

The lead tab-attached positive electrode (LP2) and the lead tab-attached negative electrode (LN2) were superimposed via an organic oxide particle-coated polyolefin separator [Hypore™] (trade name) (thickness of 21 μm, air permeability of 80 s/100 cm$^3$) so that the mixture-coated surface of each electrode faced the other to form a laminated electrode body. The laminated electrode body was housed in a 100 mm×90 mm aluminum laminate sheet outer packaging body and vacuum-dried at 80° C. for 5 hours to remove moisture. Subsequently, the non-aqueous electrolyte solution (S1) described above was then injected into the outer packaging body, and the outer packaging body was sealed, thereby producing a single-layer laminate type (pouch type) non-aqueous secondary cell (small).

Except that the lead tab-attached positive electrode (LP3) and the lead tab-attached negative electrode (LN3) were used, a single-layer laminate type (pouch type) non-aqueous secondary cell (large) was produced by the same procedure as above.

(6-4) Initial Charge/Discharge Process of Single-Layer Laminate Type Non-Aqueous Secondary Cells The obtained single-layer laminate type non-aqueous secondary cells (small) and (large) as described above were set to an ambient temperature of 25° C., and each was charged for 2 hours at a constant current of 0.025 C. After pausing for 3 hours, the cells were charged at a constant current of 0.05 C to reach 3.7 V, and then charged at a constant voltage of 3.7 V until the current attenuated to 0.02 C. Thereafter, the cells were discharged at a constant current of 0.05 C until 2.0 V.

(6-5) Production of Series Module and Evaluation of Charging/Discharging

The single-layer laminate type non-aqueous secondary cells with different design capacities obtained in (6-4) above were connected in series to produce a module. The ratio of the maximum capacity (36.6 mAh) to the minimum capacity (31.9 mAh) of the non-aqueous secondary cells constituting the module was 1.15. The obtained series module was set to an ambient temperature of 25° C. and charged at a constant current of 0.1 C to reach 7.4 V, and then at a constant voltage of 7.4 V until the total charging time reached 16 hours or the current attenuated to 0.05 C. Thereafter, the module was discharged at a constant current corresponding to 0.1 C until 4.0 V. The cycle of charging/discharging was repeated three times. The results are shown in Tables 4 and 5 below.

The voltage increased first in the single-layer laminate type non-aqueous secondary cell (small). However, due to the effect of high ionic conductivity, even with a thick-film electrode, the redox shuttle functioned sufficiently to level the voltage near 3.8 V as a unit cell, and further voltage increase was suppressed. The single-layer laminate type non-aqueous secondary cell (large) reached a nearly fully charged state while the other non-aqueous secondary cell plateaued near 3.8 V. In the second cycle, both of the non-aqueous secondary cells exhibited nearly the same charge/discharge behavior. The same result as the second cycle was obtained in the third cycle, thereby proving that the state of the unit cells with different capacities was corrected.

Example 7

(7) Evaluation of Series Connection at 25° C. (SOC Adjustment of Non-Aqueous Secondary Cells with Different Design Capacities)

(7-1) SOC Adjustment of Single-Layer Laminate Type Non-Aqueous Secondary Cell

After the evaluation of series connection at 25° C. in (6) above, the series connection of the single-layer laminate type non-aqueous secondary cells (small) and (large) were severed. The ambient temperature was set to 25° C. and charging was carried out at a constant current corresponding to 0.2 C to adjust the SOC of the single-layer laminate type non-aqueous secondary cell (small) to 60% and the SOC of the single-layer laminate type non-aqueous secondary cell (large) to 40%.

(7-2) Production of Series Module and Evaluation of Charging/Discharging

The single-layer laminate type non-aqueous secondary cells (small) and (large) with different design capacities after SOC adjustment, obtained in (7-1) above, were reconnected in series to produce a module. The ratio of the maximum capacity (22.0 mAh) to the minimum capacity (12.8 mAh) of the non-aqueous secondary cells constituting the module was 1.72. The obtained module was set to an ambient temperature of 25° C. and charged at a constant current of 0.1 C to reach 7.4 V, and then at a constant voltage of 7.4 V until the total charging time reached 16 hours or the current attenuated to 0.05 C. Thereafter, the module was discharged at a constant current corresponding to 0.1 C until 4.0 V. The cycle of charging/discharging was repeated three times. The results are shown in Tables 4 and 5 below.

The voltage increased first in the single-layer laminate type non-aqueous secondary cell (small). However, due to the effect of high ionic conductivity, even with a thick-film electrode, the redox shuttle functioned sufficiently to level the voltage near 3.8 V as a unit cell, and further voltage increase was suppressed. The single-layer laminate type non-aqueous secondary cell (large) reached a nearly fully charged state while the other non-aqueous secondary cell plateaued near 3.8 V. In the second cycle, both of the non-aqueous secondary cells exhibited nearly the same charge/discharge behavior. The same result as the second cycle was obtained in the third cycle, thereby proving that the state of the unit cells with different capacities was corrected.

Example 8

(8) Evaluation of Series Connection at 50° C. (Non-Aqueous Secondary Cells with Different Design Capacities)

After the evaluation of charging/discharging at 25° C. in (7) above, the series module was set to an ambient temperature of 50° C. and charged at a constant current of 0.1 C to reach 7.4 V, and then at a constant voltage of 7.4 V until the total charging time reached 16 hours or the current attenuated to 0.05 C. Thereafter, the module was discharged at a constant current corresponding to 0.1 C until 4.0 V. The cycle of charging/discharging was repeated three times. The results are shown in Tables 4 and 5 below.

The voltage increased first in the single-layer laminate type non-aqueous secondary cell (small). However, due to the effect of high ionic conductivity, even with a thick-film electrode, the redox shuttle functioned sufficiently to level the voltage near 3.8 V as a unit cell, and further voltage increase was suppressed. The single-layer laminate type non-aqueous secondary cell (large) reached a nearly fully charged state while the other non-aqueous secondary cell plateaued near 3.8 V. In the second cycle, both of the non-aqueous secondary cells exhibited nearly the same charge/discharge behavior. The same result as the second cycle was obtained in the third cycle, thereby proving that the state of the unit cells with different capacities was corrected even when the temperature was increased to 50° C.

Example 9

(9) Evaluation of High-Rate Series Connection at 50° C. (Non-Aqueous Secondary Cells with Different Design Capacities)

After the evaluation of series connection at 50° C. in (8) above, the series module was maintained at the ambient temperature of 50° C. and charged at a constant current of 0.2 C to reach 7.4 V, and then at a constant voltage of 7.4 V until the total charging time reached 8 hours or the current attenuated to 0.05 C. Thereafter, the module was discharged at a constant current corresponding to 0.2 C until 4.0 V. The cycle of charging/discharging was repeated three times. The results are shown in Tables 4 and 5 below.

The voltage increased first in the single-layer laminate type non-aqueous secondary cell (small). However, due to the effect of high ionic conductivity, even with a thick-film electrode and at 0.2 C, the redox shuttle functioned sufficiently to level the voltage near 3.8 V as a unit cell, and further voltage increase was suppressed. The single-layer laminate type non-aqueous secondary cell (large) reached a nearly fully charged state while the other non-aqueous secondary cell plateaued near 3.8 V. In the second cycle, both of the cells exhibited nearly the same charge/discharge behavior. The same result as the second cycle was obtained in the third cycle, thereby proving that the state of the unit cells with different capacities was corrected even in a high-rate condition at 50° C.

The results of Examples 6 to 9 are shown in Tables 4 and 5 and FIGS. 6 to 9 below.

TABLE 4

| | | \multicolumn{9}{c}{Single-layer laminate type non-aqueous secondary cell (small)} |
| | Non-aqueous electrolyte solution | Initial charge capacity (mAh) | Initial discharge capacity (mAh) | Initial charge/ discharge efficiency (%) | Second charge capacity (mAh) | Second discharge capacity (mAh) | Second charge/ discharge efficiency (%) | Third charge capacity (mAh) | Third discharge capacity (mAh) | Third charge/ discharge efficiency (%) |
| --- | --- | --- | --- | --- | --- | --- | --- | --- | --- | --- |
| Example 6 | S1 | 36.8 | 32.2 | 87.5 | 32.3 | 32.0 | 99.1 | 32.0 | 31.9 | 99.7 |
| Example 7 | S1 | 21.5 | 32.0 | 148.8 | 32.1 | 31.8 | 99.1 | 31.9 | 31.7 | 99.4 |
| Example 8 | S1 | 36.4 | 31.5 | 86.5 | 31.7 | 31.4 | 99.1 | 31.5 | 31.3 | 99.4 |
| Example 9 | S1 | 36.0 | 31.4 | 87.2 | 31.6 | 31.3 | 99.1 | 31.4 | 31.2 | 99.4 |

TABLE 5

| | | \multicolumn{9}{c}{Single-layer laminate type non-aqueous secondary cell (large)} |
| | Non-aqueous electrolyte solution | Initial charge capacity (mAh) | Initial discharge capacity (mAh) | Initial charge/ discharge efficiency (%) | Second charge capacity (mAh) | Second discharge capacity (mAh) | Second charge/ discharge efficiency (%) | Third charge capacity (mAh) | Third discharge capacity (mAh) | Third charge/ discharge efficiency (%) |
| --- | --- | --- | --- | --- | --- | --- | --- | --- | --- | --- |
| Example 6 | S1 | 36.8 | 32.2 | 87.5 | 32.3 | 32.0 | 99.1 | 32.0 | 31.9 | 99.7 |
| Example 7 | S1 | 21.5 | 32.0 | 148.8 | 32.1 | 31.8 | 99.1 | 31.9 | 31.7 | 99.4 |
| Example 8 | S1 | 36.4 | 31.5 | 86.5 | 31.7 | 31.4 | 99.1 | 31.5 | 31.3 | 99.4 |
| Example 9 | S1 | 36.0 | 31.4 | 87.2 | 31.6 | 31.3 | 99.1 | 31.4 | 31.2 | 99.4 |

INDUSTRIAL APPLICABILITY

The non-aqueous secondary cell of the present invention, in addition to storage cells for automobiles such as hybrid vehicles, plug-in hybrid vehicles, and electric vehicles, is expected to be used as industrial storage cells in, for example, electric tools, drones, and electric bikes, and further as residential power storage systems.

REFERENCE SIGNS LIST

100 non-aqueous secondary cell
110 cell outer packaging
120 space in cell outer packaging
130 positive electrode lead structure
140 negative electrode lead structure
150 positive electrode
160 negative electrode
170 separator

The invention claimed is:

1. A cell pack comprising non-aqueous secondary cells each comprising a non-aqueous electrolyte solution containing an electrolyte salt and a non-aqueous solvent, a positive electrode, and a negative electrode, wherein
the cell pack is configured with a module in which two or more of the non-aqueous secondary cells are connected in series or with two or more of the modules connected in parallel, or the cell pack is configured with a module in which two or more of the non-aqueous secondary cells are connected in parallel or with two or more of the modules connected in series;
each of the non-aqueous secondary cells constituting the module has a ratio of maximum capacity (B) to minimum capacity (A) of $1.00<B/A<2.00$; and
the non-aqueous electrolyte solution contains a redox shuttle having a reversible redox potential at a greater electropositive potential than a positive electrode potential at full charge,
wherein the redox shuttle contains a compound represented by general formal (1) below:

[Chem. 1]

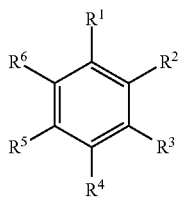

(1)

wherein $R^1$, $R^2$, $R^3$, $R^4$, $R^5$, and $R^6$ represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms,
the non-aqueous solvent contains acetonitrile and a linear carbonate, and
the electrolyte salt comprises an imide salt and $LiPF_6$, the imide salt has a content of 0.5 mol to 3 mol per L of the non-aqueous solvent, and $LiPF_6<$the imide salt in molar ratio in the non-aqueous electrolytic solution.

2. The cell pack according to claim 1, comprising the compound represented by the general formula (1) in an amount of 0.1 to 20% by mass with respect to a total amount of the non-aqueous electrolyte solution.

3. The cell pack according to claim 1, wherein each of the non-aqueous secondary cells constituting the module has a capacity of 1 mAh to 100 Ah, and each of the non-aqueous secondary cells has a ratio of maximum capacity (B) to minimum capacity (A) of $1.05<B/A<2.00$.

4. The cell pack according to claim 1, wherein in the non-aqueous solvent, the volume ratio of the acetonitrile is less than the volume ratio of the linear carbonate.

5. The cell pack according to claim 1, wherein the non-aqueous electrolyte solution has an ionic conductivity of 10 to 50 mS/cm at 25° C.

6. The cell pack according to claim 1, wherein a positive electrode active material layer contained in the positive electrode has a basis weight of 15 to 100 mg/cm$^2$.

7. The cell pack according to claim 1, wherein the positive electrode contains a lithium-containing compound comprising Fe.

8. The cell pack according to claim 1, wherein the negative electrode contains graphite or at least one or more elements selected from the group consisting of Ti, V, Sn, Cr, Mn, Fe, Co, Ni, Zn, Al, Si, and B.

9. A method for manufacturing a cell pack which comprises non-aqueous secondary cells each comprising a non-aqueous electrolyte solution containing an electrolyte salt and a non-aqueous solvent, a positive electrode, and a negative electrode, comprising the following steps: forming a laminated body comprising the positive electrode and the negative electrode; producing the non-aqueous secondary cell in which the laminated body and the non-aqueous electrolyte solution are contained and sealed in a cell outer packaging; and configuring the cell pack such that the cell pack is configured with a module in which two or more of the non-aqueous secondary cells are connected in series or with two or more of the modules connected in parallel, or the cell pack is configured with a module in which two or more of the non-aqueous secondary cells are connected in parallel or with two or more of the modules connected in series, wherein each of the non-aqueous secondary cells constituting the module has a ratio of maximum capacity (B) to minimum capacity (A) of $1.00<B/A<2.00$, and the non-aqueous electrolyte solution contains a redox shuttle having a reversible redox potential at a greater electropositive potential than a positive electrode potential at full charge,
wherein the non-aqueous solvent contains 5 to 95% by volume of acetonitrile and a linear carbonate as an amount per total amount; the redox shuttle comprises a compound represented by general formula (1) below:

[Chem. 3]

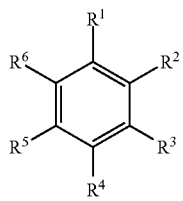

(1)

wherein R1, R2, R3, R4, R5, and R6 represent substituents and are each independently a hydrogen atom, a halogen atom, an aryl group, an alkyl group having 1 to 4 carbon atoms, a fluorine-substituted alkyl group having 1 to 4 carbon atoms, an alkoxy group having 1 to 4 carbon atoms, or a fluorine-substituted alkoxy group having 1 to 4 carbon atoms, wherein two or more of the substituents are alkoxy groups having 1 to 4 carbon atoms or fluorine-substituted alkoxy groups having 1 to 4 carbon atoms; the compound represented by the general formula (1) is contained in an amount of 0.1 to 20% by mass with respect to a total amount of the non-aqueous electrolyte solution; and the electrolyte salt comprises an imide salt and $LiPF_6$, the imide salt has a content of 0.5 mol to 3 mol per L of the non-aqueous solvent, and LiPF6< the imide salt in molar ratio in the non-aqueous electrolyte solution.

10. The method for manufacturing a cell pack according to claim 9, wherein each of the non-aqueous secondary cells constituting the module has a capacity of 1 mAh to 100 Ah, and each of the non-aqueous secondary cells has a ratio of maximum capacity (B) to minimum capacity (A) of 1.05<B/A<2.00.

11. The method for manufacturing a cell pack according to claim 9, further comprising initially charging the non-aqueous secondary cells at 0.001 to 0.3 C.

12. The cell pack according to claim 2, wherein each of the non-aqueous secondary cells constituting the module has a capacity of 1 mAh to 100 Ah, and each of the non-aqueous secondary cells has a ratio of maximum capacity (B) to minimum capacity (A) of 1.05<B/A<2.00, the non-aqueous solvent contains acetonitrile and a linear carbonate, the electrolyte salt comprises an imide salt and $LiPF_6$, the imide salt has a content of 0.5 mol to 3 mol per L of the non-aqueous solvent, and $LiPF_6$<the imide salt in molar ratio in the non-aqueous electrolyte solution.

\* \* \* \* \*